United States Patent
Schaaf et al.

(10) Patent No.: US 11,019,218 B2
(45) Date of Patent: May 25, 2021

(54) TALK STATION FOR INTERCOM NETWORK

(71) Applicant: riedel communications international gmbh, Wuppertal (DE)

(72) Inventors: Stephan Schaaf, Oberstadtfeld (DE); Bernhard Hanisch, Remscheid (DE); Jake Dodson, Wuppertal (DE); Thomas Riedel, Wuppertal (DE)

(73) Assignee: RIEDEL COMMUNICATIONS INTERNATIONAL GMBH, Wuppertal (DE)

( * ) Notice: Subject to any disclaimer, the term of this patent is extended or adjusted under 35 U.S.C. 154(b) by 0 days.

(21) Appl. No.: 16/110,338

(22) Filed: Aug. 23, 2018

(65) Prior Publication Data
US 2019/0166256 A1 May 30, 2019

(30) Foreign Application Priority Data

Nov. 29, 2017 (DE) .......................... 102017128217.3
Mar. 16, 2018 (DE) .......................... 102018106257.5

(51) Int. Cl.
*H04M 1/00* (2006.01)
*H04M 9/08* (2006.01)
*H04M 9/02* (2006.01)

(52) U.S. Cl.
CPC .............. *H04M 9/08* (2013.01); *H04M 9/02* (2013.01)

(58) Field of Classification Search
CPC ........................................................ H04M 9/08
USPC .................................................... 455/550.1
See application file for complete search history.

(56) References Cited

U.S. PATENT DOCUMENTS

| 4,868,530 A | 9/1989 | Ahs |
| 6,075,518 A | 6/2000 | Pruchniak |
| 6,124,555 A * | 9/2000 | Isikawa .................. G05G 9/047 |
| | | 200/18 |
| 6,809,275 B1 | 10/2004 | Cheng et al. |

(Continued)

FOREIGN PATENT DOCUMENTS

| DE | 102006017598 A1 | 10/2006 |
| GB | 2405190 A | 2/2005 |

(Continued)

OTHER PUBLICATIONS

"Sprechanlagen".In: Onlinebibliothek Wikipedia:p. 1-2. Jul. 23, 2017.URL=https://de.wikipedia.org/w/index.php?title=Sprechanlage &oldid=167504447.

(Continued)

*Primary Examiner* — Huy C Ho
(74) *Attorney, Agent, or Firm* — Andrew Wilford

(57) ABSTRACT

The invention relates to, among others, a communication station (10) for an intercom network (11), comprising a plurality of operating elements (15*a*, 15*b*, 15*c*, 15*d*) each of which are configured in the manner of a lever (49*a*, 49*b*, 49*c*, 49*d*, 49*e*, 49*f*, 49*g*, 49*h*, 49*i*, 49*j*), wherein a lever starting from an inactive middle position (39*a*) is manually shiftable in a first direction (31) into a first switching position (39*b*) or alternatively shiftable in a second direction (32) contrary to the first into a second switching position (39*c*), wherein the lever is biased toward its middle position. The special feature of the invention consists, among others, in that the lever comprises a rotatably mounted adjustment element (59, 59*a*, 59*b*, 59*c*, 59*d*, 59*e*, 59*f*, 59*g*, 59*h*, 59*i*, 59*j*) for changing a parameter.

18 Claims, 19 Drawing Sheets

(56) References Cited

U.S. PATENT DOCUMENTS

| | | | |
|---|---|---|---|
| 2002/0054153 A1 | 5/2002 | Arnold | |
| 2002/0158844 A1 | 10/2002 | McLoone et al. | |
| 2008/0251371 A1 | 10/2008 | Sugahara et al. | |
| 2011/0094864 A1* | 4/2011 | Laurent | G05G 9/04737 200/329 |
| 2014/0238831 A1* | 8/2014 | Kagaya | H01H 19/03 200/336 |
| 2016/0050505 A1* | 2/2016 | Riedel | H04M 1/72513 381/85 |
| 2016/0334830 A1 | 11/2016 | Sirohiwala et al. | |
| 2018/0166836 A1 | 6/2018 | Fritz | |
| 2018/0198635 A1 | 7/2018 | Lee | |
| 2018/0288207 A1 | 10/2018 | Riedel | |
| 2018/0288527 A1 | 10/2018 | Riedel | |
| 2018/0288595 A1 | 10/2018 | Lee | |

FOREIGN PATENT DOCUMENTS

| | | | |
|---|---|---|---|
| JP | 11503 Z1 | 4/1989 | |
| JP | 08292767 A | 11/1996 | |
| JP | 10050178 A | 2/1998 | |
| JP | 2006253082 A | 9/2006 | |
| JP | 2007257852 A | 10/2007 | |
| JP | 2008305687 A | 12/2008 | |
| JP | 2011-175756 A | 9/2011 | |
| JP | 2017-027797 A | 2/2017 | |

OTHER PUBLICATIONS

"Telefonanlagen". In: Onlinebibliothek Wikipedia: p. 1-2. 217.08.2017. URL=https://de.wikipedia.org/w/index.php?title=Telefonanlage&oldid=168223548.

D40AB Benutzerhandbuch: D40AB_UserGuide-V2_144x204_GER.indd 1 Dec. 5, 2011 11:41. p. 1-52. URL=https://www.hoerhelfer.de/out/media/D40AB_UserGuide-V2_144x204_GER.pdf.

D40AB_UserGuide-V2_144x204-GER.indd, Dec. 5, 2011.

https://de.wikipedia.org/w/index.php?title=Sprechanlage&oldid=167504447; Jul. 23, 2017.

https://de.wikipedia.org/w/index_php?title=Telefonanlage&oldid=168223548.

* cited by examiner

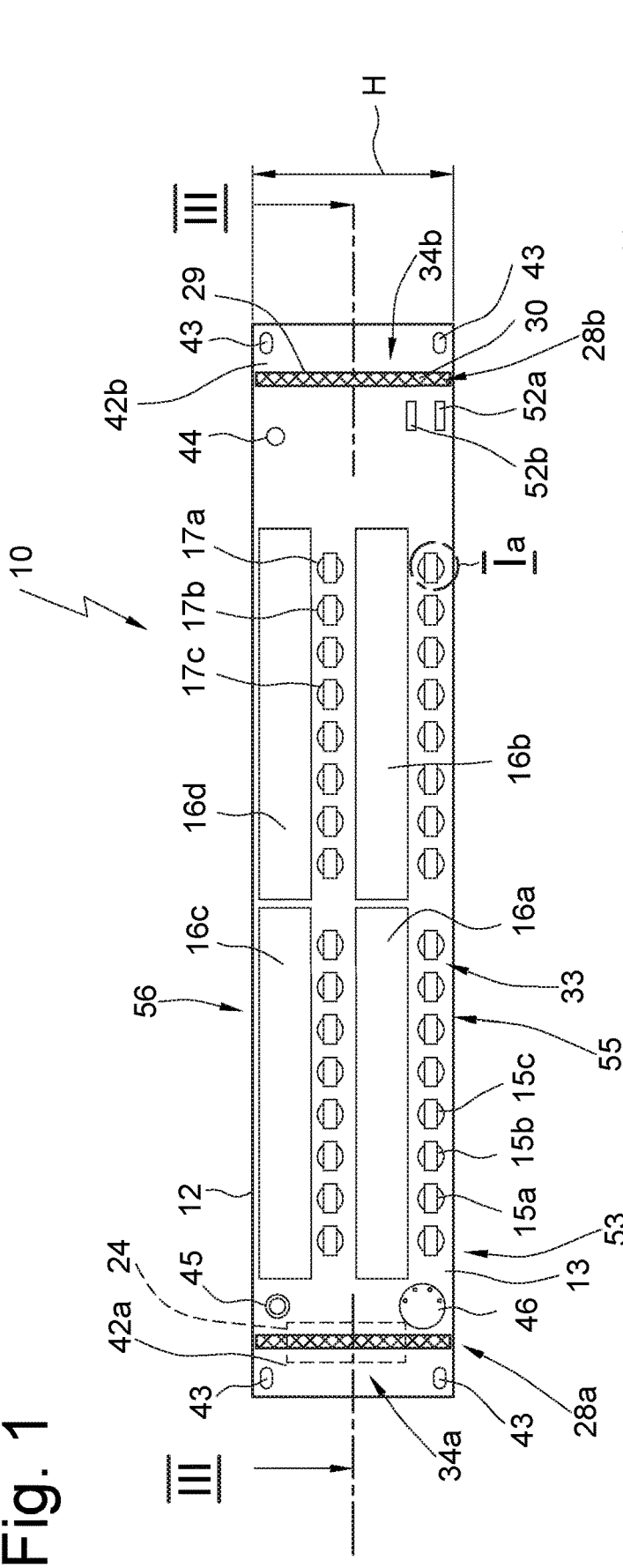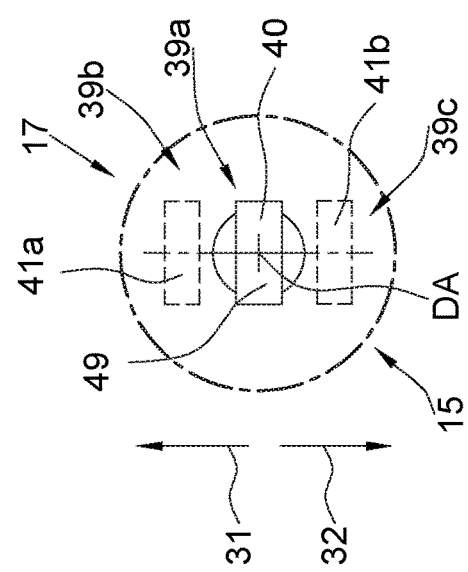

TALK STATION FOR INTERCOM NETWORK

FIELD OF THE INVENTION

The invention relates to a communication station for an intercom network comprising a plurality of operating elements configured as levers each manually shiftable in a first direction starting from an inactive middle position into a first switching position or alternatively shiftable into a second switching position along a second direction opposite the first direction, the lever being biased toward its middle position.

BACKGROUND OF THE INVENTION

The applicant has been developing and manufacturing such communication stations for intercom networks for more than three decades.

As regards the function of a communication station in terms of the invention, reference should be made to the following patent applications of the applicant: DE 10 2014 011 963 [US 2016/0050505] and the subsequently published patent applications DE 10 2017 107 148 [US 2018/0288595], DE 10 2017 107 150 [US 2018/0198635], DE 10 2017 106 946 [US 2018/0166836], DE 10 2017 116 002 [2018/0288527], DE 10 2017 116 273 [US 2018/0288207] whose contents for the purpose of avoiding repetitions is hereby included by reference the present patent application, also for the purpose of making reference to individual characteristics and further for the purpose of including in the claims of the present patent application, individual characteristics contained in the described patent applications.

With state-of-the-art patent applications a plurality of operating elements is on the housing front. When actuating an operating element, a direct listening and/or speaking connection can be established to a selected other communication station. The communication stations are connected to one another via an exchange station, wherein the exchange station administers and manages the intercom network and connects the circuits.

By selecting and actuating a certain operating element the operator of this communication station selects a certain other communication station.

With state-of-the-art communication stations it is already known to provide levers that depending on their design are called two-position levers or three-position levers. Starting from a middle position, toward which the lever is spring-biased, the lever can be shifted into a first direction or into a second direction. When being shifted in a first direction, e.g. upward, the lever assumes a first working position or switching position, and when being shifted in a second direction, e.g. downward, which is oriented in the direction contrary to the first direction, the lever can be shifted into a second working position or second switching position.

As a rule the operator needs to press and hold the lever for as long as a listening connection or speaking connection or a listening and speaking connection is to be maintained.

The two switching positions provide different functions. The first switching position may be for a speaking connection for example and the other switching position may be for a listening connection. As soon as the operator ceases to exert a force upon the lever element, this is shifted back into the middle position by the spring pre-tension, and the listening connection or speaking connection or the listening and speaking connection is interrupted and terminated.

Communication stations of this kind are for example used at events or live events. It is possible to provide numerous different communication stations, for example 20 or 50, which can all communicate with each other via the exchange station. The noise levels of individual communication stations vary in the extreme, in particular at live events or sports events. The operators of a communication station also have distinct preferences. Finally communication stations may have different microphone settings.

In order to enable an operator of a communication station to select individual volume settings for the different listening connections or speaking connections with other communication stations, the operating elements are programmable. As such the volume level of each individual operating element can be varied and set with the aid of, for example, a volume control. However, setting it is rather laborious and uncomfortable as well as prone to malfunction.

OBJECT OF THE INVENTION

Based on these facts the object of the invention consists in further developing the generic communication station in such a way that, whilst maintaining a conventional comfortable operation, a better way of setting an individual volume level or another parameter which is related to the operating element, can be achieved.

SUMMARY OF THE INVENTION

This object is attained by the invention in that the lever comprises a rotatably mounted adjustment element for changing a parameter, or in that the lever overreaches such an adjustment element.

According to a first variant of the invention the lever comprises a rotatably mounted adjustment element. This is used for changing and thus for setting a parameter. The parameter may, for example, be the loudness or volume level that is assigned to the operating element. The rotatably mounted adjustment element may for example be a setting wheel, a rotary lever, a rotary knob or the like. The adjustment element is directly on the lever. It can therefore be advantageously shifted in conjunction with the lever. It may be in the area of the free end of the lever or alternatively in the area of the pivoted end of the lever. The adjustment element may also be in the area of a central portion of the lever.

By rotating the lever about a certain angle of rotation in a first direction of rotation or in an opposite second direction of rotation or by rotating the adjustment element by one turn or by several turns, the parameter such as the volume level can be set. The action of setting or changing the parameter may also directly initiate storing of the set parameter value.

A subsequent actuation of the adjustment element can reduce or increase the parameter. Following a further actuation the changed parameter value can be immediately stored.

According to a first variant of the invention the adjustment element for changing the parameter, in particular the volume level, is directly on the lever. This means that the adjustment element is directly assigned to the lever that is not the case in the state of the art. Moreover, arranging the adjustment element directly on the lever ensures that the adjustment element can be operated in a particularly good and comfortable manner.

Preferably the adjustment element is used for changing the volume level. It is possible, for example, to directly set or change the volume level of the microphone or the volume level of the loudspeaker that is fixed on the communication station. But it is also possible, as a parameter change, to change a volume level signal that is present at a microphone port or a loudspeaker port or which is assigned to such a port.

According to a second variant of the invention the lever encompasses the rotatably mounted adjustment element. With this variant the adjustment element is for example rotatably mounted on a front side of the housing of the communication station or, at any rate, rotatably relative to the front side of the communication station, which means that it cannot be shifted together with the lever. The lever overreaches the adjustment element and for this reason, may comprise for example a recess. The adjustment element that is arranged fixedly but rotatably, passes right through the recess as a result of a relative movement of the lever.

At the same time it is achieved that the adjustment element is directly assigned to the lever. This variant also allows a particularly good and comfortable operation to be achieved.

With the second variant of the invention, in which the lever overreaches the adjustment element, a shifting of the lever past the immovably fixed adjustment element can be effected.

Both in the middle position and in the two switching positions of the lever the rotary element is easily accessible for the operator and can be rotated and thus actuated. At the same time, however, a direct spatially close assignment is achieved so that the operator can perform both a comfortable and easy shift of the lever and an actuation of the adjustment element.

Whilst according to the first variant of the invention the adjustment element follows a shifting movement of the lever, the adjustment element of the second variant of the invention is fixed relative to the communication station and does not follow a shifting movement of the lever.

According to a second aspect, the invention is based on the objective to further develop the generic communication station in such a way that while maintaining the comfortable selection options of communication stations to which an audio connection shall be established, and while maintaining a conventional comfortable mode of operation, it is possible to improve setting an individual volume level or another Parameter.

This objective is achieved by the invention in that the selection button comprises or overreaches a rotatably mounted adjustment element.

As regards this aspect of the invention, reference is made to the statements made further above to avoid repetitions.

According to a further advantageous design of the invention the selection button is shaped similar to a lever. As a result a particularly comfortable operation is achieved.

According to a further advantageous design of the invention the level can be shifted along a linear movement path. In particular when looking at the communication station from the front, that is when looking at the housing front of the communication station, the lever can be shifted, starting from a central position respectively, vertically upward or vertically downward into One of two working positions or switching positions. As a result an intuitive comfortable operation can be achieved.

According to a further advantageous design of the invention the housing front of the communication station has at least one port for a headset on it. The port may, in particular, be configured as a male XLR socket or as another port for a headset. Actuation of the adjustment element is followed by further electronic processing within the communication station, for example a control operation by, in particular, a processor which ensures that a volume level signal for a loudspeaker or a microphone with a corresponding volume strength or signal strength is generated.

According to a further advantageous design of the invention the rotary axis of the adjustment element is oriented transversely or essentially transversely to the first direction. As a result it is possible to operate the adjustment element in an intuitive easily accessible and comfortable but also a secure manner less prone to malfunction.

It is pointed out that according to the invention movement of the selection button/the lever from the central position into a switching position is linked to a movement of the adjustment element. The adjustment element is therefore connected to the lever or to the selection button in such a way that their movements are coupled or that they both move in unison. This ensures a particularly secure operation less prone to malfunction. The user of the communication station can without problems differentiate intuitively and safely between an actuation of the lever from its central position into a first switching position or working position and a rotary movement of the adjustment element, without these two different actuations adversely affecting or overlaying each other.

According to a further advantageous design of the invention the lever has an elongated shape. Further advantageously it is provided that the rotary axis of the adjustment element extends along a longitudinal extension of the lever. The rotary axis of the adjustment element therefore is moved in unison with the lever's movement in the first direction and also in unison with the lever's movement contrary to the first direction. Due to the orientation of the rotary axis described here, a particularly good separation of the two actuation options is achieved.

According to a further advantageous design of the invention parameters are set and/or changed as a result of a rotation of the adjustment element. Rotation of the adjustment element can be detected, registered and recorded and processed in a simple conventional manner by an electronic system or another suitable electronic component. This allows e.g. electronic values for the parameter to be entered into a register or to be overwritten. These registered values can also be stored or further processed by a microprocessor in the communication station. Thus setting or changing of a parameter, such as for example the loudness value for a microphone or for a loudspeaker, is possible directly or indirectly.

A parameter to be changed in terms of the invention, apart from the volume level or a signal corresponding to the volume level, can also be e.g. a value for an illumination or indication of the communication station, e.g. a value for the illumination intensity. Also an illumination or indication can be spatially assigned directly or indirectly to a lever or a selection button of the communication station.

Also the illumination intensity of a display assigned to this lever or this selection button or its color or color indication can be changed or set as a parameter by a rotation of the adjustment element.

According to a further advantageous design of the invention the number of rotations of the adjustment element or the size of the angle of rotation by which the adjustment element has been rotated, or the frequency, with which the adjustment element has been actuated, can be used as a measure for changing a parameter. In particular, the angle of rotation or the number of rotations can correspond proportionally to a value for changing a parameter. As a result data processing can be achieved in a particularly simple manner.

According to a further advantageous design of the invention the communication station comprises a memory which stores the set or changed parameter value. The memory may be a volatile or non-volatile memory. As such the communication station is provided with a microprocessor or a computing unit or a control which accesses or can read the memory. The parameter value written into the memory can be used by this control of the communication station or used by another computing unit. This allows the volume level of a loudspeaker or a microphone to be stored, changed or used as a setting.

According to a further advantageous design of the invention the parameter corresponds to a value for the volume level of the loudspeaker or comprises such a value. Alternatively the parameter comprises a signal value for volume level signal present at the loudspeaker port or for a microphone signal present at a microphone port.

This can be used to set the volume level and the loudspeaker or the volume level of the microphone.

According to a further advantageous design of the invention the adjustment element is designed in the manner of a continuously rotatable wheel. This permits a particularly comfortable operation.

Alternatively the adjustment element may be designed in the manner of a rotatable wheel which comprises an end stop in one or in both directions of rotation.

According to a further advantageous design of the invention the lever is designed as a three-position lever. This means that the lever apart from a middle position can also assume two deflected positions or switching positions or working positions.

According to a further advantageous design of the invention the adjustment element is at the free end of the lever. As a result the adjustment element is particularly easily accessible for a comfortable actuation of the adjustment element.

According to a further advantageous design of the invention the adjustment element may be partially encompassed by material regions of the lever. As a result erroneous operation of the adjustment element can be prevented or reduced.

According to a further advantageous design of the invention the adjustment element is close to a pivoted end of the lever. As a result the adjustment element can be actuated, or the lever can be shifted from the middle position into a switching position with different regions of the user's fingers or using different finger positions.

According to a further advantageous design of the invention the adjustment element has ribs or projections on its outer surface. This gives the user a particularly good feel.

Further, the above described objective is achieved by the invention for the communication station in which the lever is altogether rotatable or tiltable about a rotary axis oriented transversely to the first direction.

With this variant the lever is designed to be altogether rotatable or tiltable. The lever can be shifted from the middle position into a first working position or switching position for a movement along a first direction of movement, or shifted into a second working position or switching position contrary to the first direction of movement. The lever is also rotatable or tiltable about a rotary axis which extends transversely to the first direction. Rotating or tilting the lever about the rotary axis also allows a parameter such as a volume level to be set or changed.

Further it may be advantageously provided that the time for which the lever remains in a tilted position is used as a measure for changing the parameter. Due to the fact that he holds the lever in a tilted position for a certain period of time, the user is able to change the parameter accordingly.

According to another aspect, this invention is based on the objective to further develop the state-of-art communication station described in the beginning in such a way that its comfort of operation is improved.

This objective is met in that the lever cooperates with a magnet that exerts high forces upon the lever when it positioned close to the middle position, urging it into its middle position, wherein at least one spring element separate from the magnet also urges the lever into the middle position.

The principle of the invention essentially consists in that the lever is urged into its middle position by at least two different elements. On the one hand, one or more spring elements, in particular conventional spring elements such as mechanical springs, e.g. coil springs, leaf springs, spiral springs, tension springs, compression springs, springs consisting of metallic or rubber-elastic material or the like may be provided whose spring restoring force increases as the deflection of the lever increases, wherein the spring force is in particular based on a spring constant. Such a spring element may for example engage at a material region of the lever, such as a pivot point of the lever. As the lever's deflection increases starting from its middle position into one of the two switching positions or working positions, the spring force increases, in particular linearly or substantially linearly. According to the invention these spring elements are designed to be relatively weak or dimensionally small. The spring elements can therefore exert only small restoring forces upon the lever deflected from its middle position and in this way urge it into its middle position.

According to the invention a magnet is additionally provided. This magnet exerts additional biasing forces onto the lever positioned outside its middle position, which urge it into the middle position. According to the first embodiment this magnet is in a fixed position, so that its cooperation with the centrally positioned lever is at its maximum. One magnet may for example be on the lever and a counter-magnet may be in a fixed position relative to a housing of the communication station or fixed relative to a housing of the communication station. Alternatively one magnet may be fixed relative to the communication station and the counter-magnet may be fixed relative to the shiftable, i.e. pivotable lever. Also the lever or a portion of the lever may be formed from a magnetic or magnetizable material or comprise such a material, wherein magnet and counter-magnet respectively interact with each other. One of the two elements, magnet or counter-magnet, is at any rate fixed relative to a housing of the communication station and the respectively other element is fixed relative to the lever and movable together with the lever.

Magnet and counter-magnet cooperate with each other in such a way that the magnetic forces urge the lever into its middle position.

The critical point is that the forces generated by the magnet and counter-magnet are effective only in a near-field, i.e. only in actual lever positions close to the middle position.

If the lever, starting from a middle position, is actuated by an operator, then starting from the middle position both the forces originating from the magnets and also the forces originating from the spring element must be overcome. As soon as the lever, starting from the middle position, while being shifted further into a-switching position or working position, has exceeded a certain pivot angle, magnet and counter-magnet have moved apart relative to each other to such an extent that the near-field has been exceeded and the magnetic forces are no longer effective. Now the operator has to overcome only the force of the spring element during a further shift of the operating element into the switching position or working position. This force is however relatively small. This means that the user who would like to hold and press the lever in one of the two working positions or switching positions, must overcome only the small restoring forces exerted by the spring element during pressing and holding the lever, in order to make the lever dwell in the working or switching position.

During a return movement however, the user is signaled in a particularly well recognizable tactile manner when the middle position has been reached. For when the lever has been shifted by a certain pivot angle along its movement path from a switching position back into the middle position, namely due to a return movement of the lever which has been generated by the first spring element, the operator can feel, assuming that his finger is still resting on the respective surface of the actuating end of the lever, that the force of the magnet is again effective and the lever as a result is exposed to an additional second and thus altogether stronger spring force acting on the lever.

During this process a kind of magnetic locking can be achieved, because the shifting movement of the lever toward the end of the shifting movement from the working position into the middle position is accelerated or becomes faster/takes place under the effect of a stronger recoil force or biasing force. This is indicated to the user in a tactile manner.

The user's operating comfort of the communication station is thereby enhanced.

BRIEF DESCRIPTION OF THE DRAWING

Further advantages of the invention are revealed in the sub-claims not cited as well as by way of the embodiments shown in the figures hereunder. In the drawing FIG. 1 is a partially cut schematic of the front of a communication station according to the invention, FIG. 1a shows a schematic, partially cut and enlarged detail view of an operating element, roughly as per reference circle Ia in FIG. 1.

SPECIFIC DESCRIPTION OF THE INVENTION

Figure 2:
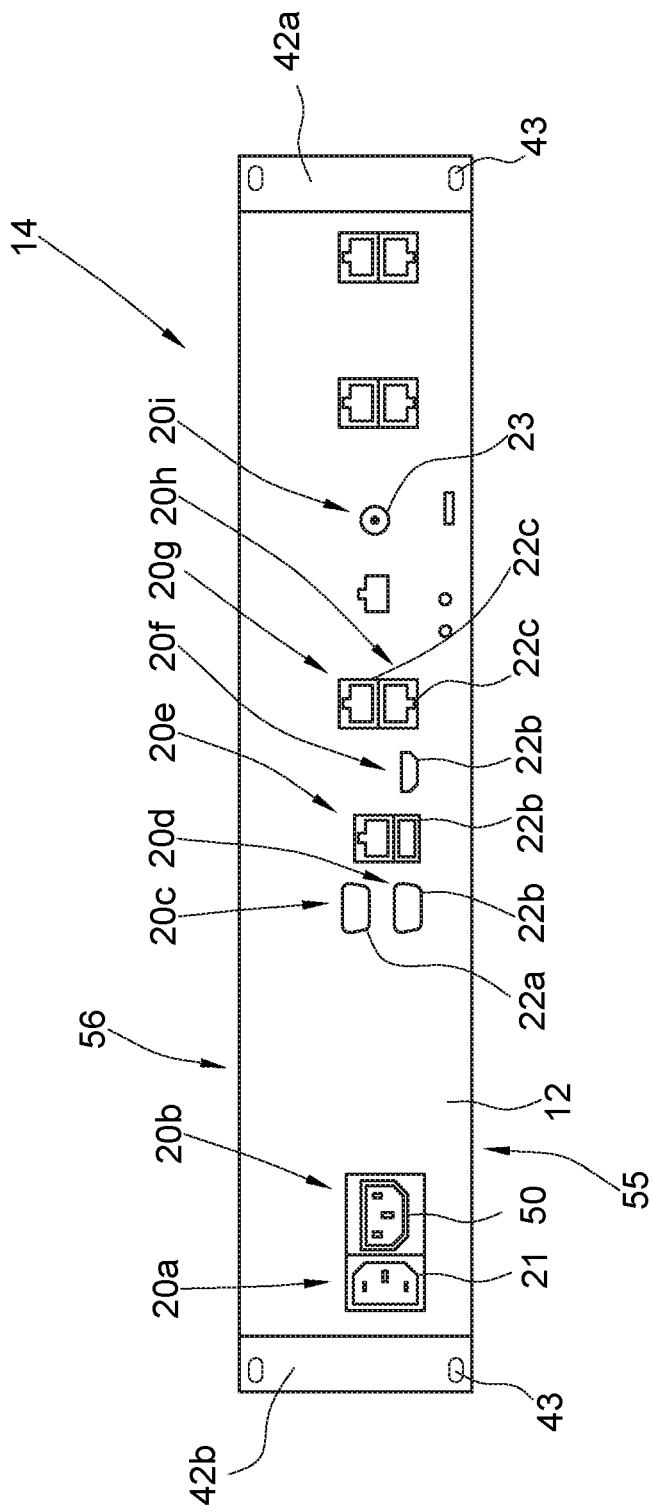
FIG. 2 is a schematic rear view of the back or housing rear side of the communication station of FIG. 1.

Embodiments of the invention will now be described by way of example in the description of the figures hereunder and with reference to the drawings. For the sake of clarity, and insofar as different embodiments are concerned, identical parts or comparable parts or elements or areas are marked with the same reference symbols, partially with the addition of lower case letters.

Characteristics which are described only with reference to one embodiment may, in terms of the invention, be provided also in other embodiments of the invention. Embodiments altered in this way, even if not depicted in the drawings, are covered by the invention.

All disclosed features are, on their own, essential to the invention. The disclosure content of the associated priority documents (copy of prior application) as well as the cited publications and described state-of-the-art devices are herewith fully included in the disclosure of the application, also for the purpose of including individual or a number of features of these documents in one or more claims of the present application.

Figure 3:
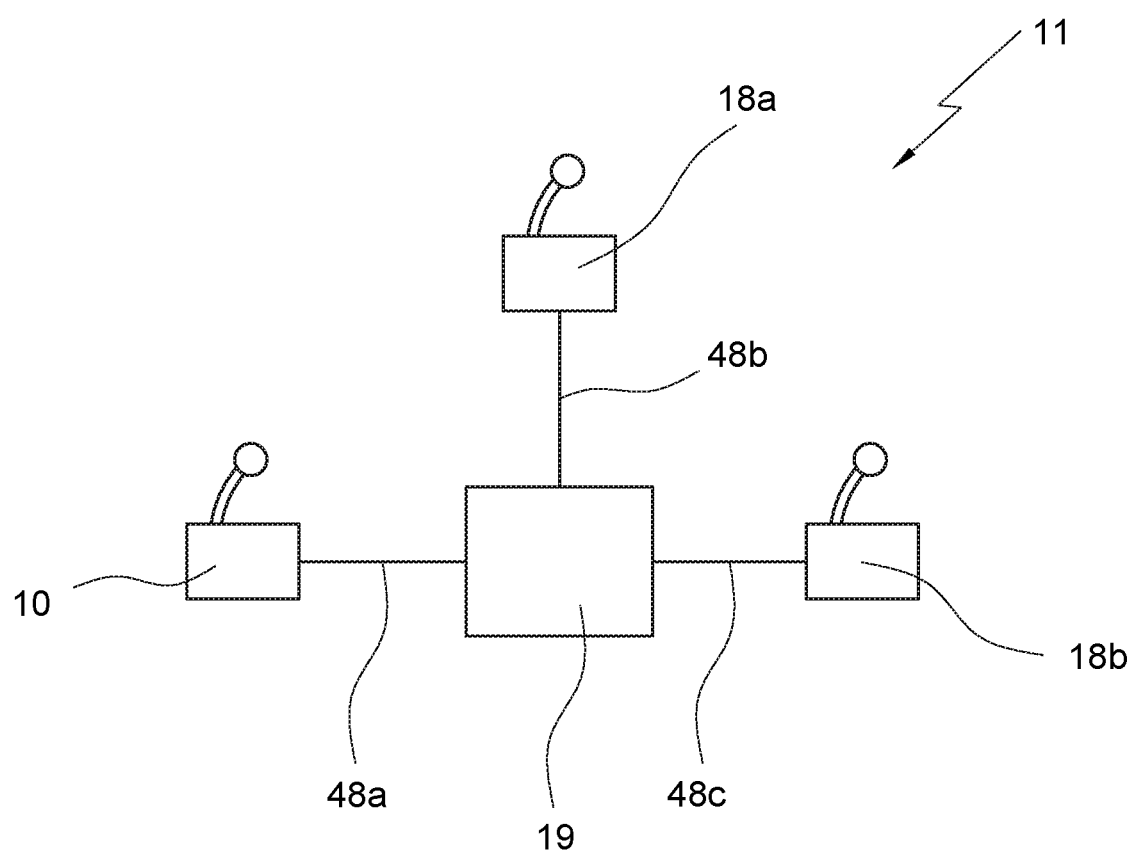
FIG. 3 is a schematic, block-diagram-type view of an embodiment of an intercom network with communication stations according to the invention.

As evident from FIG. 1 an embodiment of a communication station according to the invention is generally marked with the reference symbol 10. The communication station 10 is used in an intercom network which is shown by example in FIG. 3 and generally marked with 11. The communication station 10 according to the invention is connected to an exchange station 19 via a connecting line 48a. Other further communication stations 18a, 18b are connected to the exchange station 19 via connecting lines 48b, 48c. The intercom network 11 can for example be used at live events such as sports events or music events. Each communication station 10, 18a, 18b may be occupied by for example a commentator, moderator, observer or other operator, who can communicate with another person at another communication station. Insofar the intercom network is a complex two-way communication system.

The communication station 10 according to the invention comprises a housing 12 shaped, for example, as a cube and merely schematically indicated in the figures, with a housing front 13 shown in FIG. 1, a housing rear side 14 shown in FIG. 2 and a ceiling wall 56 as well as a floor wall 55.

The front side 13 or housing front 13 of the communication station 10 has a plurality of operating elements 15a, 15b, 15c, 15d and a plurality of displays 16a, 16b, 16c, 16d on it. The operating elements 15a, 15b, 15c, 15d are configured as selection buttons 17a, 17b, 17c, 17d. The operating elements 15a, 15b, 15c, 15d are programmable so that for example each operating element 15a, 15b, 15c, 15d can have a certain other communication station of the intercom network 11 assigned to it. The exchange station 19 administers and manages these direct point-to-point connections.

By operating a certain selection button, e.g. the selection button 17b in FIG. 1, the user of this communication station 10 as per FIG. 1 can establish a direct audio connection, e.g. a listening connection or a speaking connection or a listening-speaking connection with an operator of another communication station 18a, 18b of the intercom network 11. All the operator has to do is actuating the selection button 17.

The details of this process are described further below.

As shown in FIG. 1 openings 28a, 28b are provided on the housing front 13 for the emission of sound waves from a loudspeaker 24 merely indicated in FIG. 1. The openings are shaped in the manner of slots 30a, 30b, but other shapes are possible.

In addition the housing front 13 has a number of ports on it, such as USB ports 52a, 52b, a microphone port 45, a headset port 46 and also a mere indication for a microphone 44.

The housing front 13 is basically shaped as a rectangle and comprises a rectangular base surface 33. Fastening sections 42a, 42b are on the lateral edges 34a, 34b of the base surface 33, the fastening sections comprising openings 43, with the aid of which the communication station 10 can be fixed to a mounting frame or rack.

On the rear side 14 of the housing 12 of the communication station 10 a plurality of ports 20a, 20b, 20c, 20d, 20e, 20f, 20g, 20h are arranged, such as for example a voltage supply port 21, data cable ports 22a, 22b, 22c, a BNC port 23 or a network "looping-through" port 50.

As shown in FIG. 1a a selection button 17 or a corresponding Operating element 15 is configured as a lever 49 or an actuating lever 49. This can, starting from a middle position 39a, 40, be shifted along a first direction 31, also called a vertical direction, into another position 39b that may be called a first working position or switching position. When alternatively, the lever is shifted starting from the middle position 32, contrary to the vertical direction 31, i.e. in counter-direction 32, it reaches starting from its middle position 40 a second position 39c that is called second working position 41b or second switching position.

The speciality of the communication station 10 according to the invention consists in that the lever 49, in a first switching position 39b, ensures a first function of the communication station 10 and, in a second switching position 39c, ensures a different second function of the communication station 10. In particular the operating element 15 or a selection button 17 is programmable in such a way that in a first working position 41a a talking mode or speaking mode is achieved, and in the second working position 41b a listening mode is achieved.

The layout is designed such that the actuating element, when in the first working position 41a or in the second working position 41b, is biased in direction of the middle position 40. Therefore the user must, as long as he wants to perform or maintain the respective function of the communication station 10, i.e. as long as he wants to remain in the talking mode or in the listening mode, keep the button actuated, i.e. hold and press it or hold and pull it.

Figure 7:
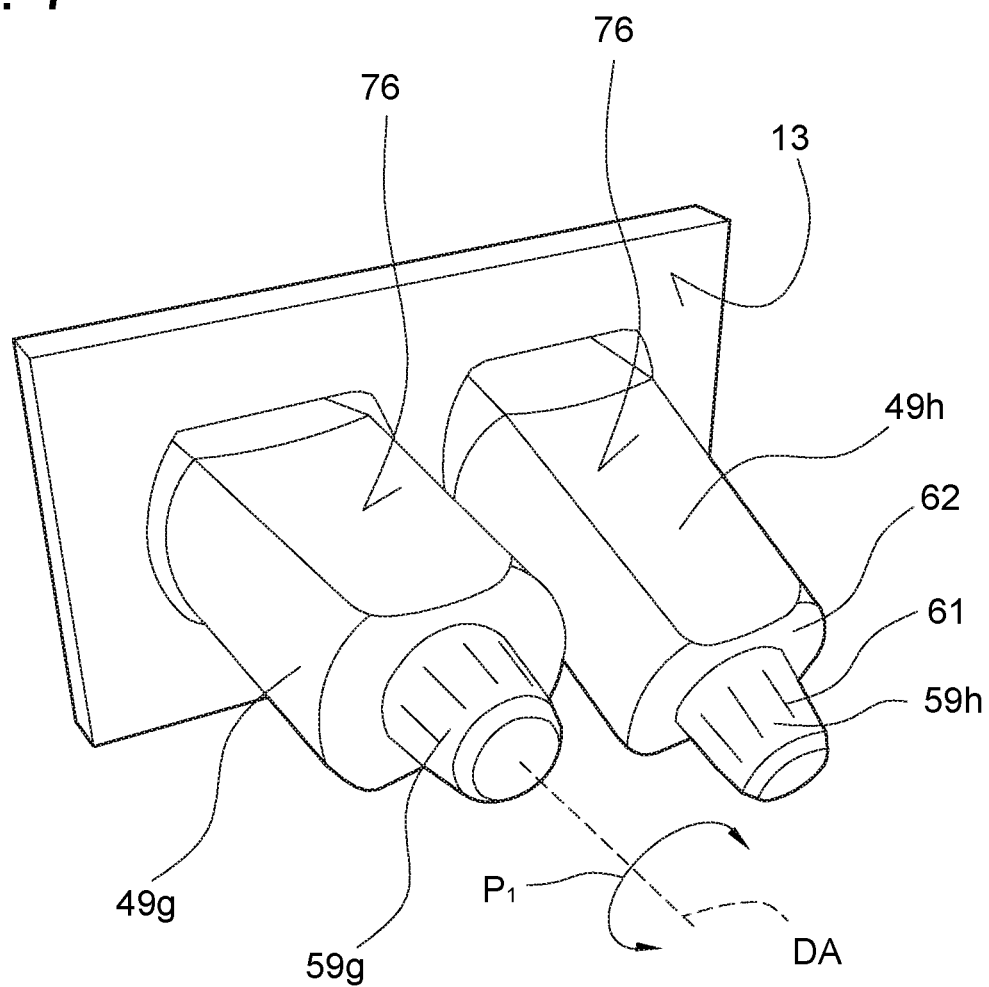
FIG. 7 shows a further embodiment in a view as per FIG. 4, wherein the operating elements are designed differently and the adjustment elements are freely accessible.
Figure 8:
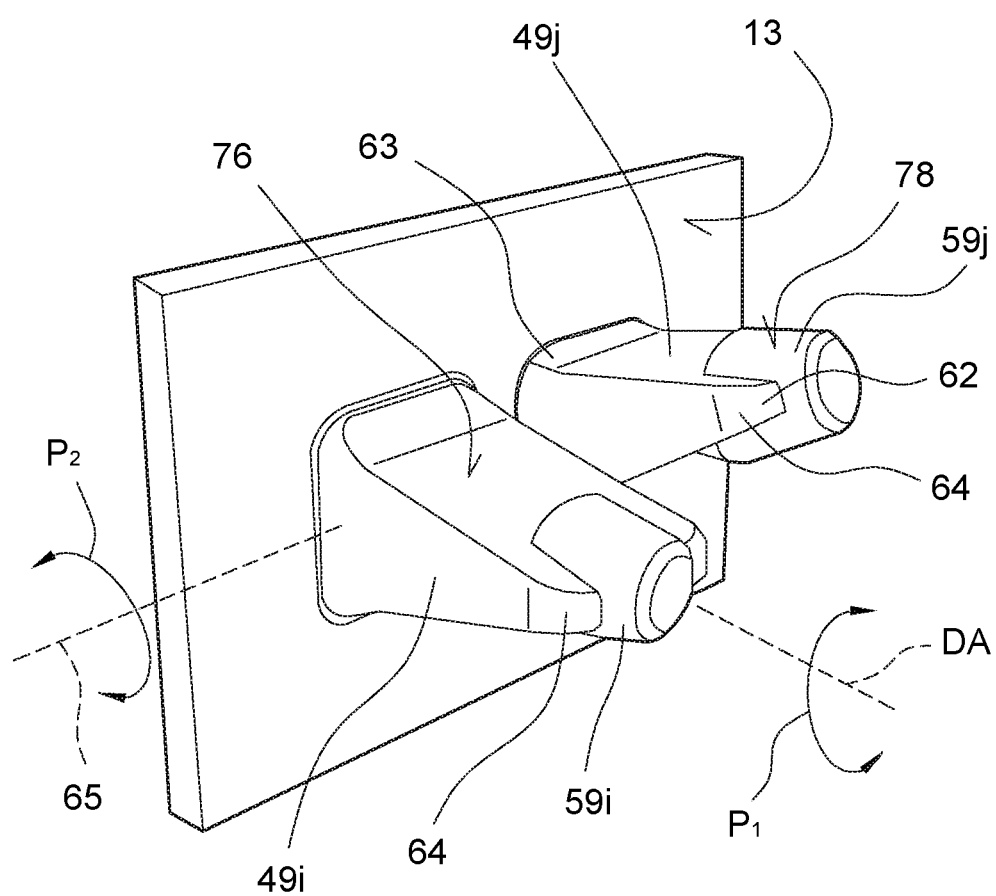
FIG. 8 shows a further embodiment similar to FIG. 7 in a view as per FIG. 4, wherein the adjustment elements are partially encompassed.
Figure 9:
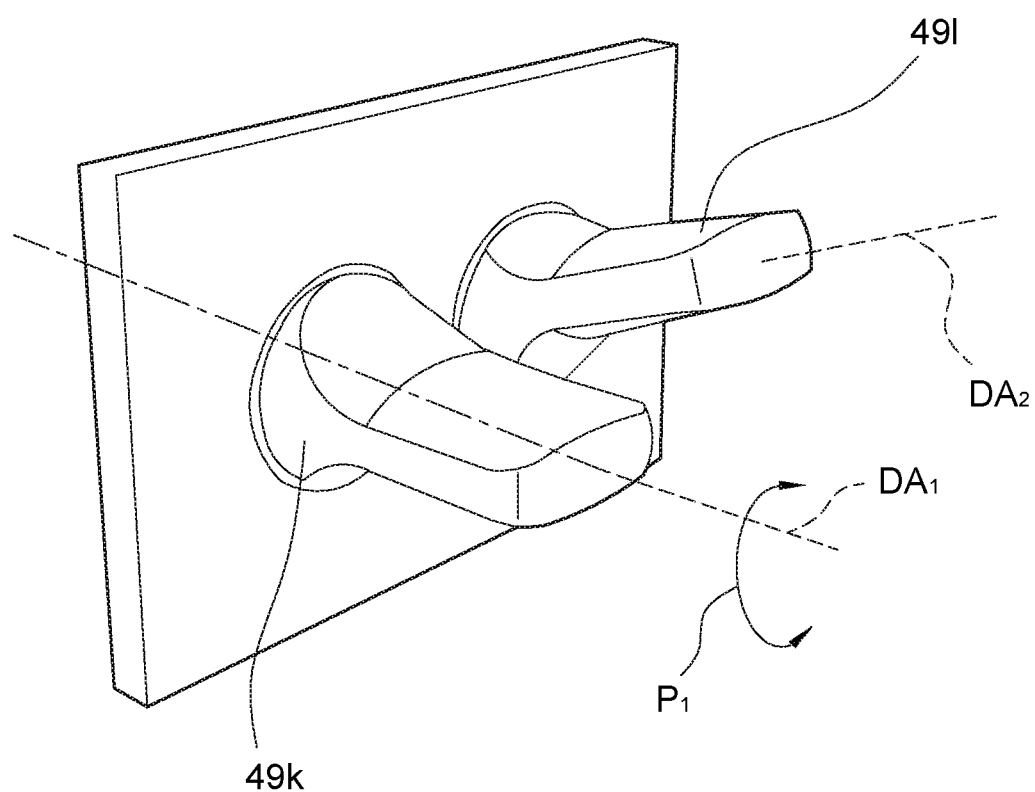
FIG. 9 shows a further embodiment in a view as per FIG. 4, wherein here the actuating element shaped as a lever can be pivoted or tilted as a whole about a rotary axis.

Now, in order to be able to set a parameter corresponding to the desired function reached by means of the switching position of the actuating lever 4, for example the volume level in the listening mode, or in order to be able alternatively, to set the volume level which is altogether relevant for this particular operating element, an adjustment element 59 is directly on the actuating element, as evident from the embodiments of FIGS. 4 to 10. In the embodiments of FIGS. 4 to 8 and 10, this adjustment element is rotatably mounted. In the embodiment of FIG. 9 the lever is mounted so as to be intrinsically rotatable or so as to be tiltable about a pivot axis.

In all embodiments 4 to 8 and 10 the adjustment element 59 is formed by a continuously rotating wheel. In order to differentiate between the different adjustment elements 59 of the different embodiments, these adjustment elements are marked with 59a to 59j. In FIGS. 4 to 9, this is done in that respectively two actuating levers 49 are depicted as an actuating lever pair and configured identically, but are shown in different positions.

Figure 6:
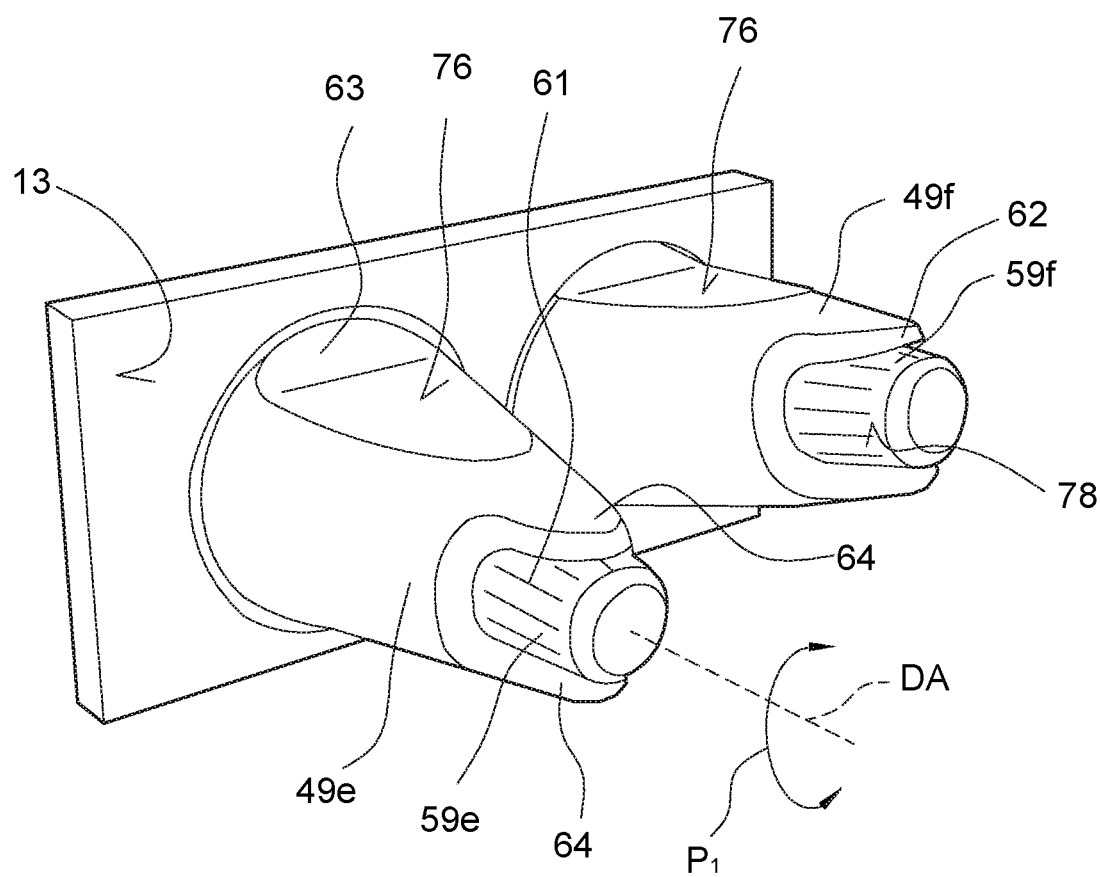
FIG. 6 shows a further embodiment in a view as per FIG. 4, wherein here adjustment elements are on the free ends of the actuating levers.

As the observer will immediately recognize in FIGS. 6 to 8, the adjustment elements 59e, 59f, 59g, 59h, 59i, 59j of the actuating levers 49e, 49f, 49g, 49h, 49i, 49j are respectively at a free end 62 of the respective actuating lever 49e, 49f, 49g, 49h, 49i, 49j. As a result good direct accessibility of the respective adjustment elements 59e, 59f, 59g, 59h, 59i, 59j is achieved. The actuating levers 49e, 49f, 49g, 49h, 49i, 49j also comprise a good actuating surface 76 that is closer to the housing front 13 than the respective adjustment element 59e, 59f, 59g, 59h, 59i, 59j.

Figure 4:
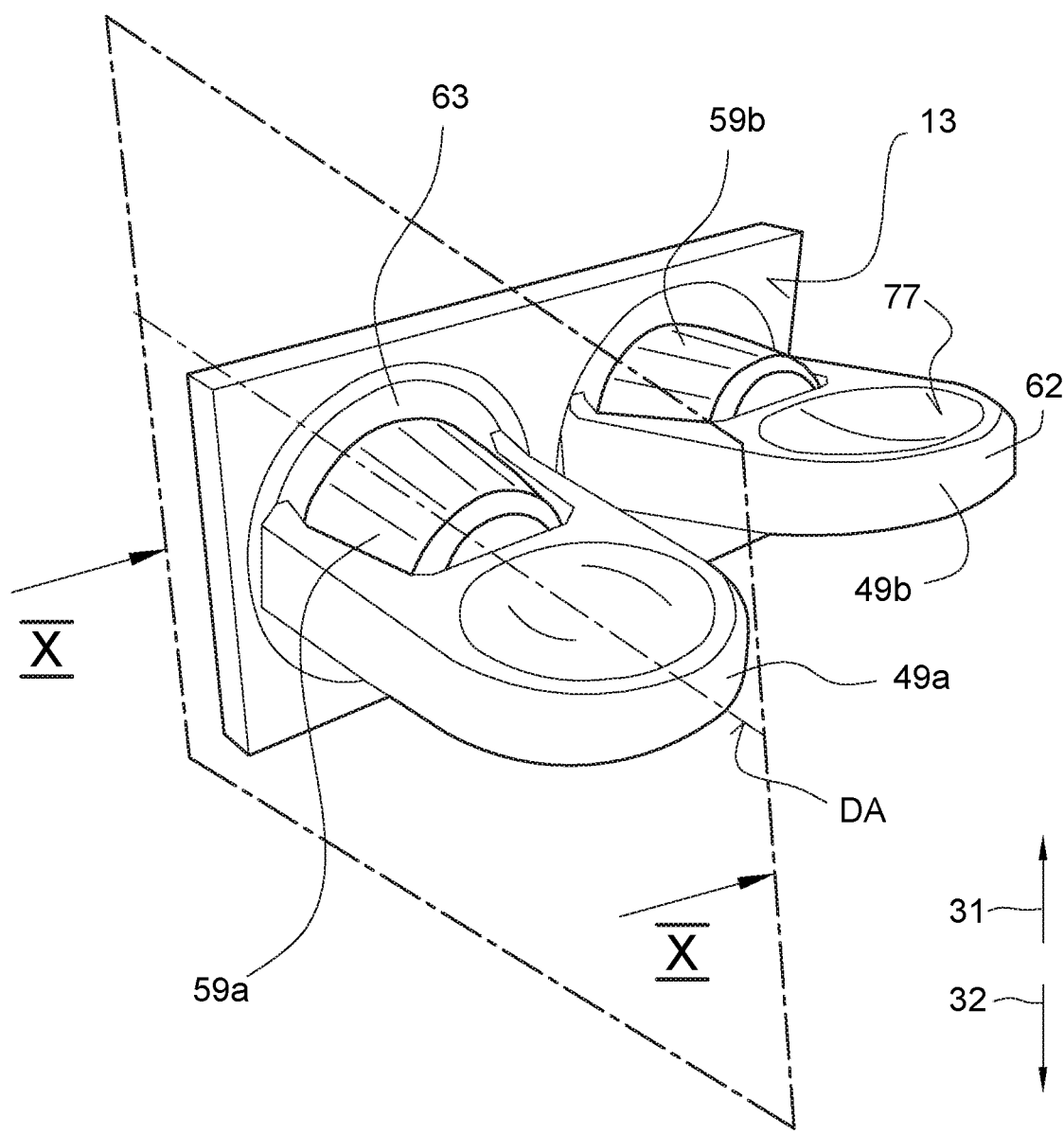
FIG. 4 is a perspective, schematic, simplified view of an extract of a further embodiment of an inventive communication station, wherein here two operating elements are shown in different positions which close to their pivoted end comprise an adjustment element in the form of a setting wheel.
Figure 5:
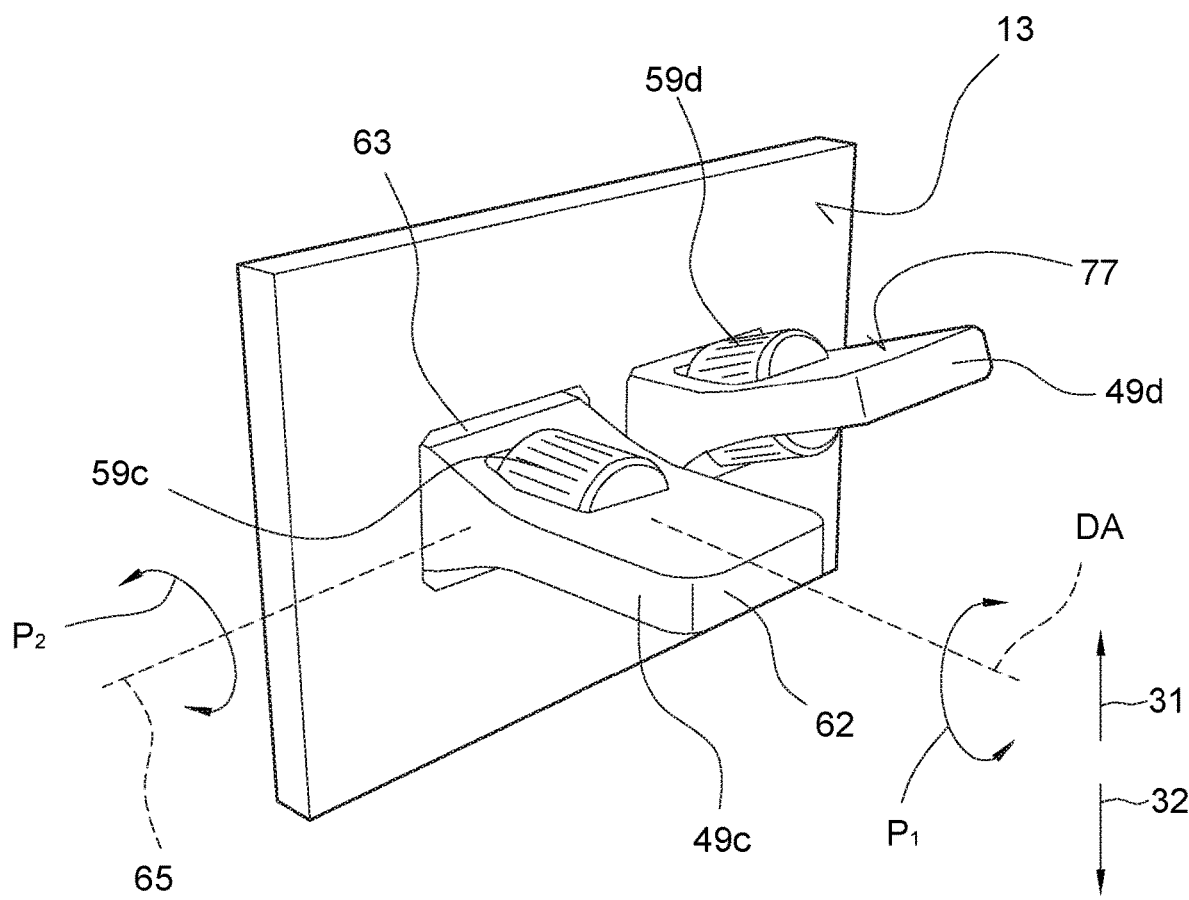
FIG. 5 shows a further embodiment of the inventive communication station in a view as per FIG. 4, but with two levers different from those in FIG. 4.

With the embodiments in FIGS. 4 and 5 by contrast, the respective adjustment elements 59a, 59b, 59c, 59d are closer to the housing front 13/closer to the pivoted end 63 of the respective actuating lever 49a, 49b, 49c, 49d. Here the actuating surfaces 77 of the corresponding actuating lever 49*a*, 49*b*, 49*c*, 49*d* are in the area of the free end 62.

It is pointed out that in the embodiments of FIGS. 6 and 8 sections 64 are provided which partially encompass the adjustment element 59*e*, 59*f*, 59*i*, 59*j*. This ensures that operating errors are avoided because respectively only part of the respective outer surface 78 of the respective adjustment element 59*e*, 59*f*, 59*i*, 59*j* is accessible.

Further we would point out that all adjustment elements 59*a* to 59*j* shown in the embodiments of FIGS. 4 to 8 are rotatable about a rotary axis DA, DA1, DA2 in a direction of rotation specified by arrow P1 and contrary thereto, wherein the corresponding rotary axis DA, DA1, DA2 corresponds to a direction, along which the respective actuating lever 49*a* to 49*j* extends elongated in longitudinal direction.

Whilst the pivot axis 65, about which the actuating element 49 is respectively pivotable (i.e. in the direction of rotation of arrow P2) in order to be transferred from the middle position 39*a* into one of the two switching positions 39*b*, 39*c*, essentially extends along the housing front 13 or parallel to the housing front 13, the rotary axis DA, DA1, DA2 about which the adjustment element 59*a*, 59*b*, 59*c*, 59*c*, 59*d*, 59*e*, 59*f*, 59*g*, 59*h*, 59*i*, 59*j* is rotatable, extends perpendicularly to the pivot axis 65 of the actuating element.

As evident from the embodiment of FIG. 9 it is also covered by the invention if the actuating element 49*k*, 49*l* is, as a whole, pivotable or tiltable about a pivot axis DA1, DA2. Here a maximum admissible pivoting or tilting about a specified angle of only a few degrees, e.g. 10°, 20° or 30° is sufficient.

The rotation or actuation of an adjustment element 59*a* to 59*j* or the tilting or pivoting of an operating element 49*k*, 49*l* about a pivot axis DA, DA1, DA2 can be captured and detected by suitable sensors. The sense of rotation or the sense of pivoting can also be captured in a similar manner.

Figure 10:
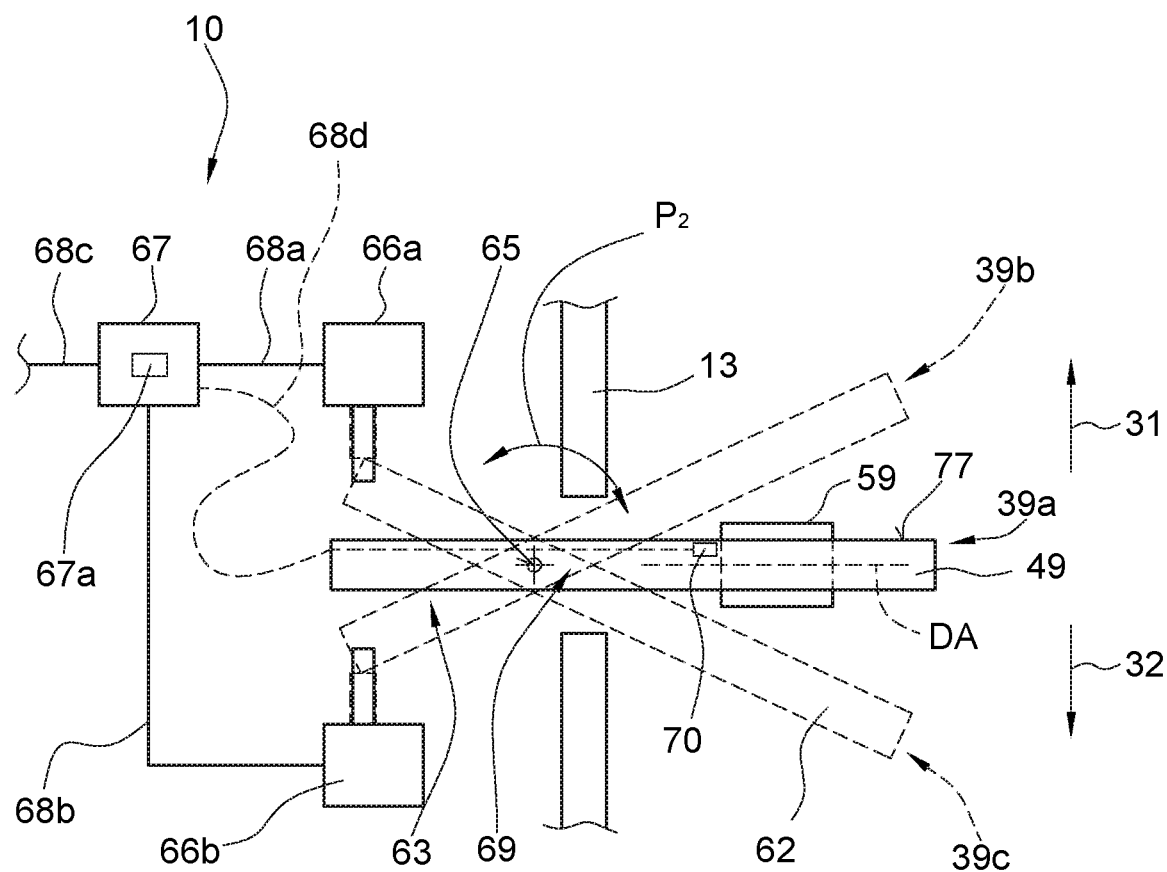
FIG. 10 shows a further embodiment of the inventive communication station in a partially cut schematic view, wherein here the operating element is shown in detail in three different positions, and wherein a sensor, two switches and a control are merely indicated in form of a kind of block diagram, in a view corresponding to a longitudinal section through a lever as per FIG. 4, roughly along the cutting plane X-X in FIG. 4.

As evident from FIG. 10 an area of the communication station 10 is depicted in a partially cut very schematic view. All that is shown is an actuating lever 49, a part of the housing front 13, an opening 69 in a housing front 13 through which the actuating lever 49 extends, a pivot axis 65 about which the actuating lever 49 is pivotable, and which is e.g. immovably relative to the housing front 13. With this embodiment an adjustment element 59 on the lever 49 is hinted at which may be configured in the manner of the adjustment element 59*a* of FIG. 4, wherein FIG. 10 again is not drawn to scale:

The block-diagram-type view of FIG. 10 shows the actuating lever 49 in its middle position 39*a* drawn as a solid line and to the two switching positions or working positions 39*b*, 39*c* drawn as broken lines.

As evident from FIG. 10 switches, detectors and sensor elements 66*a*, 66*b* can be provided on the communication station 10 that can detect by way of contacting that a switching position or working position 39*b*, 39*c* of the actuating lever 49 has been reached. The two detectors or switches 66*a*, 66*b* are connected via schematically drawn signal or connecting lines 68*a*, 68*b* to a computing unit or control 67. The control 67 can be connected via a connecting or signal line 68*c* of which merely a small section is shown, to further electronic components (not shown) or the communication station 10.

The type and configuration of the switches and sensors 66*a*, 66*b* is not important to the invention. Conventional arrangements may be employed here. What is important is that the communication station 10 is capable of detecting that a switching or working position 39*b*, 39*c* of the actuating lever 49 has been reached and that further electronic data processing is carried out. It is not until it is detected that a switching position has been reached, that the communication station 10 establishes an audio connection, i.e. a listening or speaking connection or a listening and speaking connection to another communication station 18*a*, 18*b* of the intercom network 11.

As evident from the schematic diagram in FIG. 10 an adjustment element 59 is on the actuating lever 49. This is rotatable about a schematically indicated rotary axis DA. In addition, again as schematically indicated, the actuating lever 49 has a sensor 70 on it. The sensor 70 may also be a detector or switch. With further embodiments of the invention not shown, the sensor 70 may be on or relative to, the communication station 10 or relative to the housing 12 of communication station.

The sensor 70 can detect an actuation of the adjustment element 59. Depending on the configuration of the adjustment element 5 the sensor 70 may also detect the sense of rotation, i.e. as to whether the adjustment element 59*a* rotates clockwise or anti-clockwise about the rotary axis DA.

Moreover the sensor 70 may detect the number of revolutions which the adjustment element performs. Alternatively an angle of rotation of the adjustment element 59 may be detected.

The captured information may be similarly communicated to a computing unit or control unit 67 via a merely schematically indicated control signal line 68*d*.

Based on the information contained therein a parameter can be set or changed or the setting of a parameter can be initiated.

Advantageously according to one embodiment of the invention the parameter comprises a volume level or volume level signal or a measure for the volume level or volume level signal or it is related to the volume level or the volume level signal.

Advantageously it is provided that either the angle of rotation by which the adjustment element 59 is rotated, or the number of revolutions of the adjustment element 59 or the time during which the adjustment element 59 is actuated, is used as a measure for the parameter change.

As evident from FIGS. 4, 5, 6 and 7 projections, here in the form of ribs 61, are on the outer surface 78 of the adjustment element 59. This makes actuation of the adjustment element 59*e*, 59*f*, 59*g*, 59*h* easier.

Figure 11:
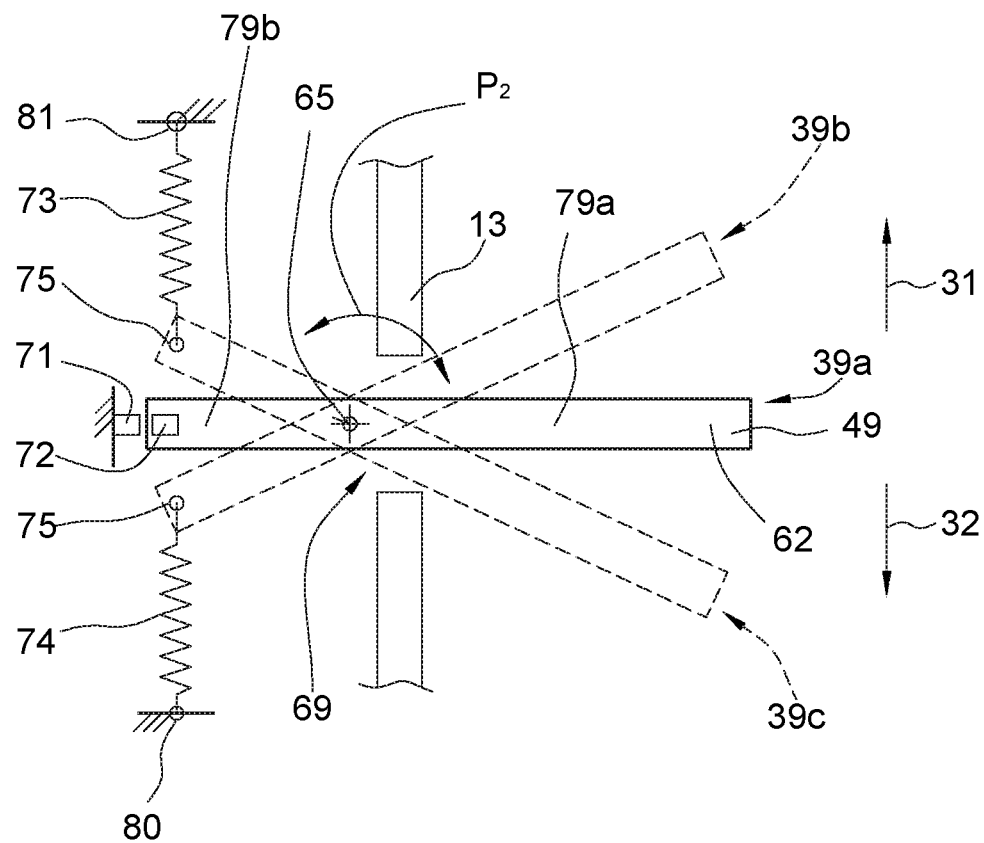
FIG. 11 is a view as per FIG. 10, a further embodiment of an inventive communication station, wherein here the operating element is shown in detail in three different positions, and wherein here a magnet, a counter-magnet and a first and a second spring element are shown.

As evident from FIG. 11 a further aspect of the invention will now be described:

FIG. 11, in a view similar to FIG. 10, shows a further embodiment of a communication station 10 according to the invention.

Here no adjustment element 59 is on the actuating lever 49. In further embodiments of this invention however arranging an adjustment element 59 on the actuating lever 49 is certainly possible.

The actuating lever 49 in the embodiment as per FIG. 11 may be configured, analogue to the view and function of the embodiment in FIG. 9, so as to be pivotable or tiltable about an axis DA that extends along a longitudinal extension of the actuating lever 49, as shown in FIG. 9.

As evident from FIG. 11 however, the important point of the invention is to offer to an operator who actuates an actuating lever 49 at a communication station 10 a particularly tactile behavior of an actuating lever 49. On the one hand this provides increased comfort and on the hand an improved use of information for the operator.

As evident from FIG. 11 the actuating lever 49, analogue to the view in FIG. 10, is pivotable about a pivot axis 65. The respectively free end 62 of the lever 49 can be shifted, starting from a middle position 39a, into one of the two switching positions 39b, 39c. This is effected by a force impacting at the free end 62 by means of a finger of a user, either in vertical direction 31, i.e. along the first direction, or in counter-direction 32.

The embodiment in FIG. 11 makes it clear that the lever 49 is pivotable about a pivot axis 65 immovably fixed relative to the housing front 13 or relative to a housing 12 of the communication station 10. The lever element 49 insofar comprises two lever arms, i.e. a first lever arm 79a and a second lever arm 79b.

In the area of the second lever arm 79b a counter-magnet 72 is on the actuating lever 49 that cooperates with a magnet 71 relative to the housing 12 of the communication station 10. Magnet 71 and counter-magnet 72 are designed such that they attract each other. The geometry of FIG. 11 makes it clear that the magnet 71, due to the magnetic forces being exerted impacts the magnet 72 such that the lever element 49 is biased toward its middle position 39a as per FIG. 1.

If the lever element 49, starting from the middle position 39a, is shifted into a working position 39b or 39c, the force of the magnet 71 as well as further forces generated by spring elements 73 and 74 must be overcome. But since the magnetic forces are only active within the immediate vicinity, just a little pivoting of the lever 49 about a very small pivot angle of e.g. 5° or 15° is sufficient in order to render the magnetic forces inactive. The magnets 71 and 72 are advantageously constructed and arranged in such a way that they are only active within a close range. In other words, the magnetic forces of the magnets 71, 72 become inactive, when the actuating lever 49 is in a position which is only a little remote from the middle position.

It is noted at this point that the counter-magnet 72 may be an element which is fixed on the actuating lever 49. Alternatively a material portion or even the entire actuating lever 49 may consist of a magnetic or magnetizable material.

As evident from FIG. 11 a first spring element 73 and a second spring element 74 are provided. The spring elements 73, 74 are each attached with a first spring end to a spring pivot point 75 on the second lever arm 79b or are attached to the lever 49 in another region thereof. The springs 73, 74 are configured as tension springs as shown in the embodiment of FIG. 11. Each of the spring elements 73, 74 therefore attempts to pull the actuating element 49 toward itself with the end of the second lever arm 79b. A stable balanced position is achieved if the lever 49 is in its middle position because the spring forces of the two spring elements 73, 74 cancel each other out.

If starting from the middle position 39a the actuating lever 49 is shifted into the second working position 39c, the pivot point 75 moves away from the retained end 80 of the second spring element 74 so that the force exerted by the second spring element 74 upon the lever 49, i.e. the restoring force, increases. At the same time the spring pivot point 75 approaches the retained end 81 of the first spring element 73 so that no force is exerted by this spring element 73 upon the lever 49.

Maintaining the switching position 39c therefore requires the operator to permanently exert a force upon the free end 62 of the lever 49 in direction 32 that is greater than the retaining force of the spring element 74.

But since the spring element 74 (and similarly also the spring element 73) is designed to be very weak, this retaining force to be exerted by the operator may be designed to be very weak. This permits the operator to maintain the working position 39c by exerting only small retaining forces, i.e. at a high degree of comfort.

As soon as the operator wishes to cancel the working position or switching position 39c, he can abruptly or gradually stop exerting force upon the lever 49 so that due to the force exerted by the spring element 74 the lever 49 shifted due to the force exerted by the spring element 74 is shifted as a result of a pivoting movement anti-clockwise about the pivot axis 65 in direction of its middle position 39a. The return of the lever 49 is initially ensured only by the spring 74.

It is not until the lever 49 is approaching its middle position 39a, and magnet 71 and magnet 72 have again approached each other to the extent that the magnetic forces can become active, that the return movement of the lever 49 back into its middle position 3a accelerates/that this happens accompanied by the generation of a greater biasing force.

The force components of the force exerted by the magnets 71, 72 and of the force exerted by the spring elements 73, 74 therefore add up/are connected in parallel. The forces exerted by the magnets 71, 72 albeit are only active at close range. Close range is understood therefore to mean the pivot positions of the actuating lever 49 that are close to its middle position 39a.

As a result of the aforesaid and due to devising the force dimension for example in such a way that the magnetic forces of the magnets 71, 72 which are only active at close range are designed to be greater or higher than the forces exerted by the spring elements 73, 74, it can be ensured that the reached switching position 39b, 39c can be maintained with less effort and thus without becoming fatigued, and with more comfort.

On the other hand, the user will be signaled in a distinctly tactile manner, due to the high magnetic forces effective at close range whose force effect also leads to a rather abrupt pivot movement of the actuating element 49, that the lever 49 has reached and will very shortly reach its middle position 39a.

In other respects it should be noted that the computing unit or control unit 67 may also comprise a memory 67a which can be used to store or further process the set or changed parameter values.

In the embodiment as per FIG. 11 two tension spring elements 73, 74 are described. In further embodiments of the invention only one spring element is described.

Finally instead of tension springs, compression springs or leaf springs or other spring elements generating restoring forces may be provided.

The critical factor is that at least one conventional first spring element becomes effective across the entire pivoting range between the middle position 39a and the respective switching position 39b, 39c, wherein the restoring forces increase along with increasing deflection of the actuating element, wherein this spring element is designed to be altogether weaker and that in parallel thereto a second spring element is provided that is only active at close range, and which generates restoring forces in particular with the aid of a magnet.

With reference to FIGS. 12 to 19 a further embodiment of an operating element 15e for a communication station according to the invention will now be described.

Figure 12:
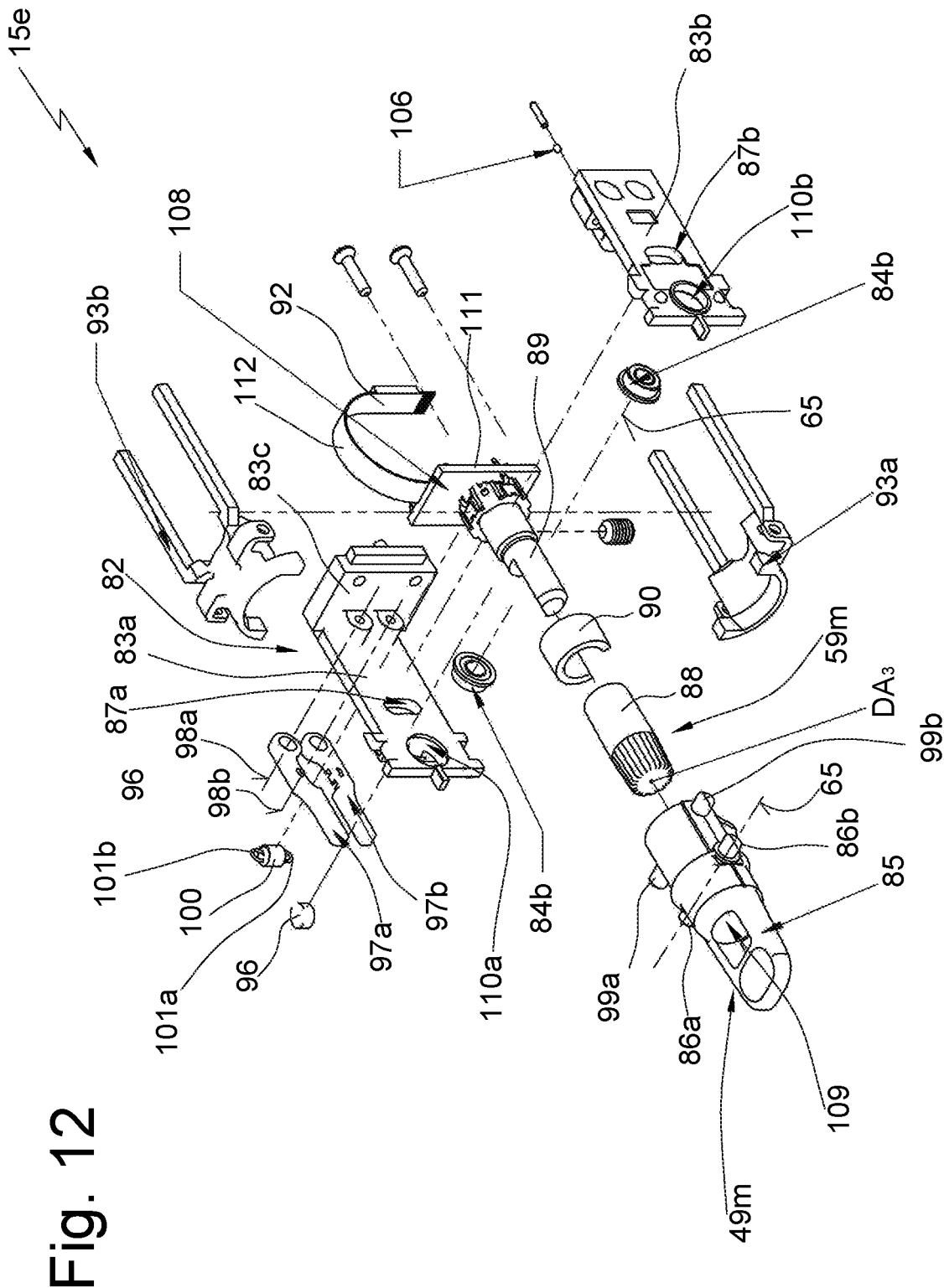
FIG. 12 shows a further embodiment of an actuating element, depicting numerous individual components in an explosive view.
Figure 13:
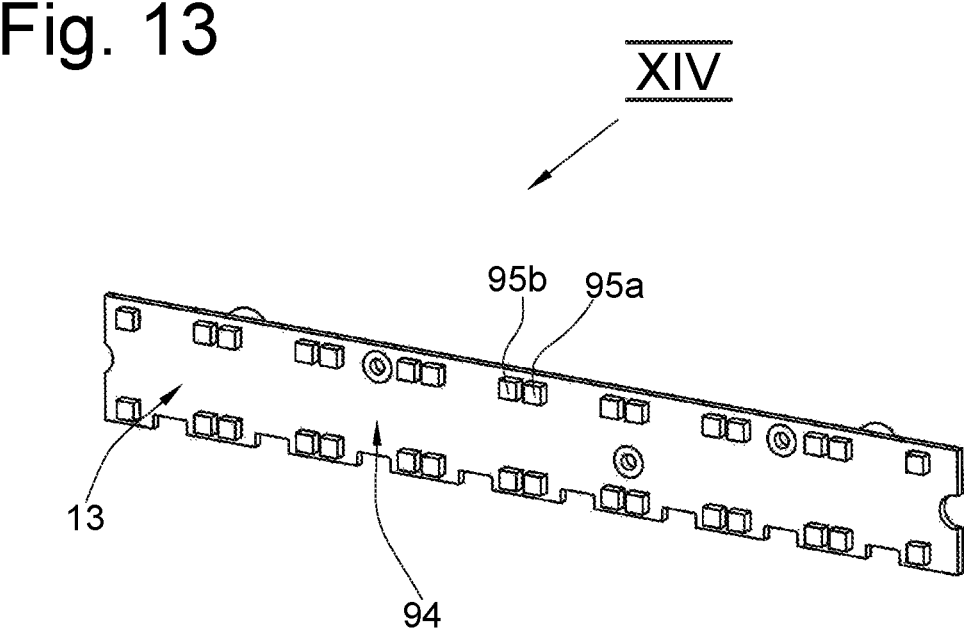
FIG. 13 is a front view of a printed circuit board, on which a number of operating elements of FIG. 12 can be fastened when assembled.
Figure 14:
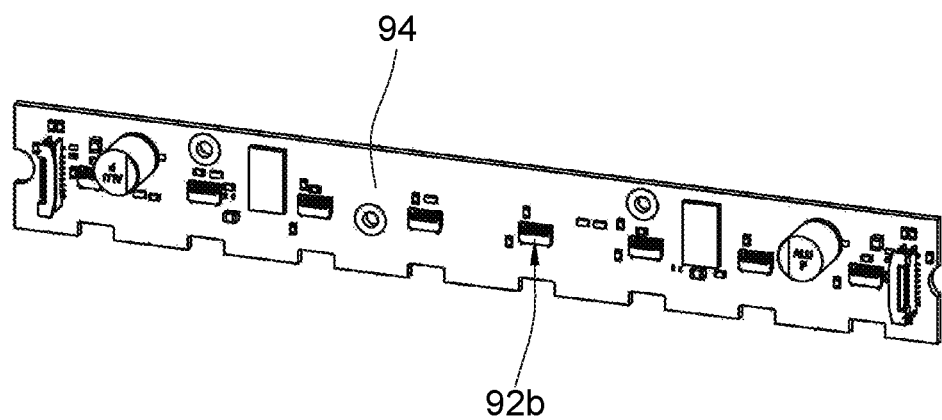
FIG. 14 is a rear view of the circuit board of FIG. 13 as per viewing arrow XIV.

As evident from FIG. 12 the operating element 15 comprises a plurality of individual parts:

To begin with FIG. 12 shows an element 49m which represents the actuating lever. This comprises a body 85 which has a recess 109 through which an adjustment element 59*m* rotatable about a rotary axis DA3 can be inserted. The body comprises two connecting pieces 86*a*, 86*b* or spigots which form a pivot bearing and which provide the pivot axis 65 of the actuating lever 49*m*.

When assembled these pivot bearing connecting pieces 86*a*, 86*b* are mounted in openings 110*a*, 110*b* of side walls 83*a*, 83*b*, which openings are provided for this purpose. The side walls 83*a*, 83*b* together with a rear wall 83*c* form a swivel mounting 82 for the actuating lever 49*m*. The swivel mounting 82 is fixed relative to the housing front 13 of the communication station, in particular on the circuit board 94 shown in FIG. 13.

In addition the corpus 85 has cam-shaped connecting pieces 99*a*, 99*b* on it that pass through curved link Slots 87*a*, 87*b* in the corresponding side wall 83*a*, 83*b*.

Figure 16:
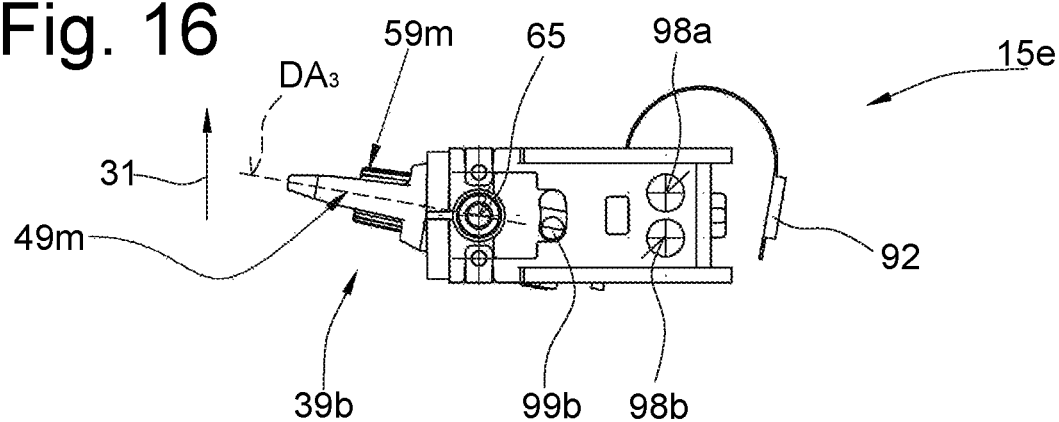
FIG. 16 shows the embodiment of FIG. 15 in a schematic side view roughly along viewing arrow XVI in FIG. 15.
Figure 17:
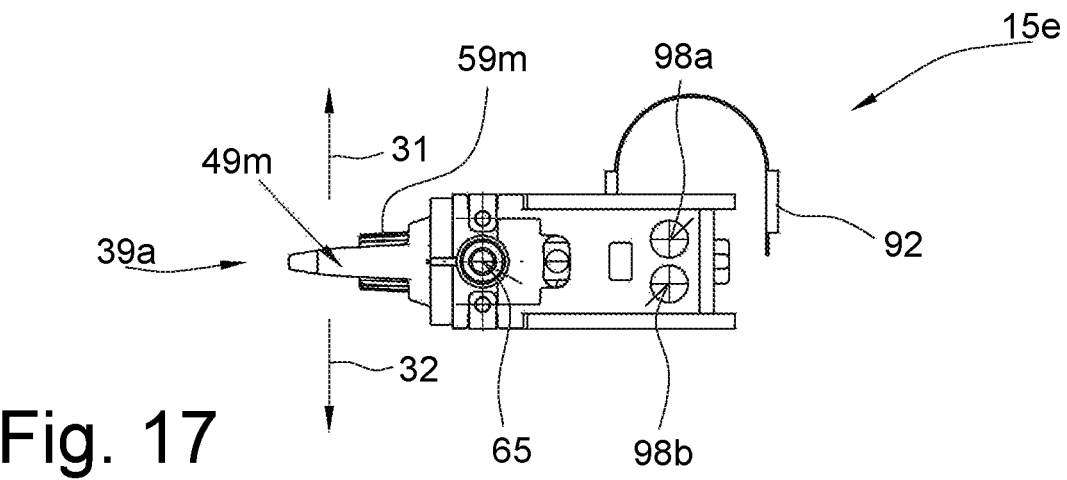
FIG. 17 shows the operating element of FIG. 16 in a view as per FIG. 16, with the lever element in a middle or central position.
Figure 18:
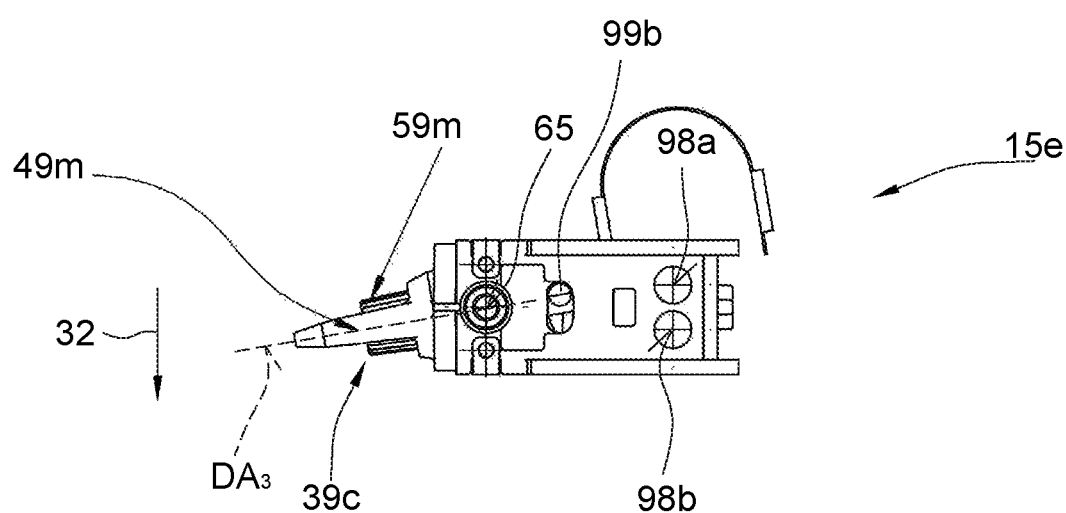
FIG. 18 shows the operating element as per FIGS. 16 and 17 in a changed switching position, FIG. 19, in a perspective rear view, shows a circuit board element, the so-called encoder unit that can be pivoted in unison with the actuating lever, in detail roughly along viewing arrow XIX in FIG. 15.

As shown in FIGS. 16 to 18 depicting different pivoted positions of the lever element 49*m*, the link slots 87*a*, 87*b* limit the swivel movement of the lever 49*m* as a result of the connecting pieces 99*a*, 99*b* coming to a stop as they touch the ends of the link slots 87*a*, 87*b*.

For completeness' sake it is noted that the pivot bearing connecting pieces 86*a*, 86*b* can be mounted in the respective housing side wall 83*a*, 83*b* with the aid of ball bearings 84*a*, 84*b*.

As evident from FIG. 12 a magnet 96 is in addition provided which is fixed on, or relative to, the side wall 83*a*. FIG. 12 furthermore shows a pair of metallic levers 97*a*, 97*b* which are each pivotable about a lever swivel axis 98*a*, 98*b*. The two levers 97*a*, 97*b* are biased toward each other with the aid of a spring element 100.

The connecting ends of the spring element 100 are marked with 101*a* and 101*b*.

Figure 15:
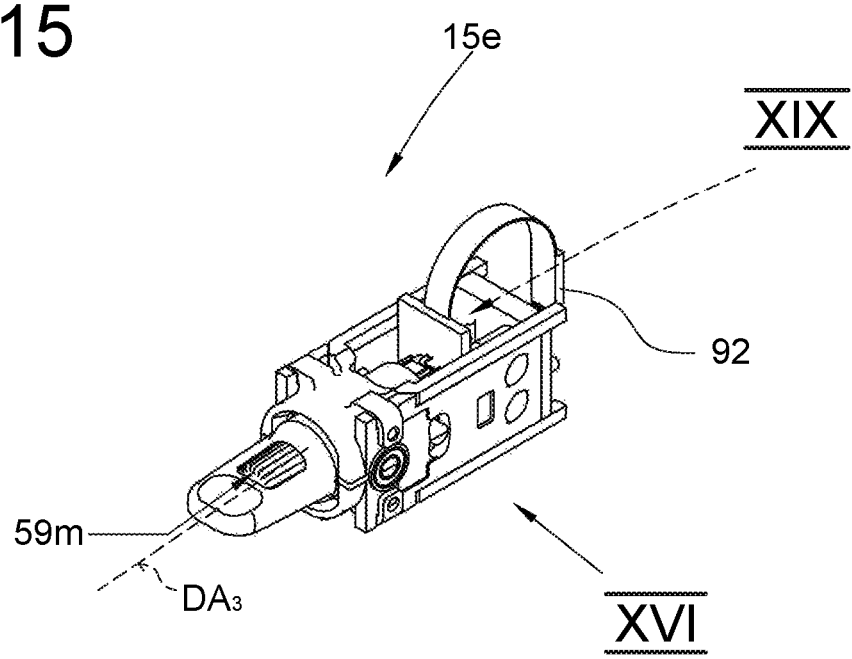
FIG. 15 shows the operating element of FIG. 12 when assembled and mounted.

When the actuating lever 49*m* is in the middle position 39*a* as per FIGS. 15 and 17, the two driving cams 99*a*, 99*b* are positioned exactly centrally between the two levers 97*a*, 97*b*.

When the lever 49*m* is deflected vertically from the middle position 39*a* as per FIG. 17 into a first switching position 39*b* as per FIG. 16, the driving cam 99*a* provided by the end of connecting piece 99*a* contacts the lower lever 97*b*, shifting the same anti-clockwise, with reference to FIG. 12, about the associated swivel axis 98*b*.

As a result the free end of this lever 97*b* initially moves away from the immovably held magnet 96 that requires exerting a first force; this is necessary in order to overcome the magnetic holding forces between the magnets 96 and the metallic levers 97*a*, 99*b* which in particular consist of iron.

As soon as the free end of the metallic lever element 97*b* has moved out of the range of influence of the magnet 96, it is only the (by comparison) weaker spring element 100 which attempts to tension the two lever elements 97*a* and 97*b* toward each other into their middle position. All the user needs to do in order to permanently hold the lever element 49*m* in its first switching position 39*b* as per FIG. 16 is to apply a force which counteracts the force of the spring element 100.

In this case also the spring element 100 is insofar connected in parallel to the group consisting of magnet 96 and counter-magnet (formed by the metallic levers 97*a*, 97*b*).

With this embodiment the magnet forces and the force of the mechanical spring 100 act in parallel in the immediate vicinity and as soon as the lever is deflected by a few degrees out of the middle position, only the mechanical forces of the spring element 100 remain effective.

Insofar the lever 49*m* here also cooperates indirectly via the levers 97*a*, 97*b* with the magnet 96.

The pair of mechanical lever elements 97*a*, 97*b* may be on the first side wall 83*a* or on the second side wall 83*b* or further alternatively also between the two side walls 83*a*, 83*b*. Advantageously the respective lever element 97*a*, 97*b* is directly mounted on the side wall 83*a*.

The spring element 100 may for example be configured as a tension spring and in its two axial end regions comprise connecting regions 101*a*, 101*b* that can cooperate with counter attachment regions on the two lever elements 97*a*, 97*b* that are not shown in detail in the figures. The layout of spring element 100 and lever elements 97*a*, 97*b* may be such that the spring element 100 with its ends 101*a*, 101*b* can be hooked onto respective projections on the two lever elements 97*a*, 97*b* or be inserted or attached in some other manner.

In the embodiment of FIGS. 12 to 19 the adjustment element 59*m* is configured as a rotary knob 88 and can be pivoted together with the actuating lever 49*m*.

The rotary knob 88 sits on a connecting piece 89 of an encoder unit 108. The encoder unit 108 is an arrangement which apart from an encoder board 111 also comprises a pivot bearing for a rotatable encoder connecting piece 89.

FIG. 12 also depicts a distance ring 90 indicated only in principle, which is to be between the encoder unit 108 and the actuating lever 49*m*.

In addition the encoder unit 108 advantageously comprises a plug-in connector 92 that can be connected to a counter-plug-in connector 92*b* on the circuit board 94 of the communication station.

Since the encoder unit 108 in this embodiment can be pivoted together with the actuating lever 49*m*, the plug-in connector is provided with a flexible conductor lead 112 that permits a certain space for movement.

Several groups of LEDs 95*a*, 95*b*, 95*c*, 95*d*, 95*e* are provided on the circuit board 94, each of which can impact a light conductor 93*a*, 93*b* with light. The light conductor illuminates the operating element 15.

A switching magnet 106 is fixed relative to the side wall 83*b* of the swivel mounting 82. This cooperates with Hall-effect sensors on the back of the encoder circuit board 111 that can detect the different working positions 39*b*, 39*c* of the actuating lever 49*m* relative to the side wall 83*b*.

Figure 19:
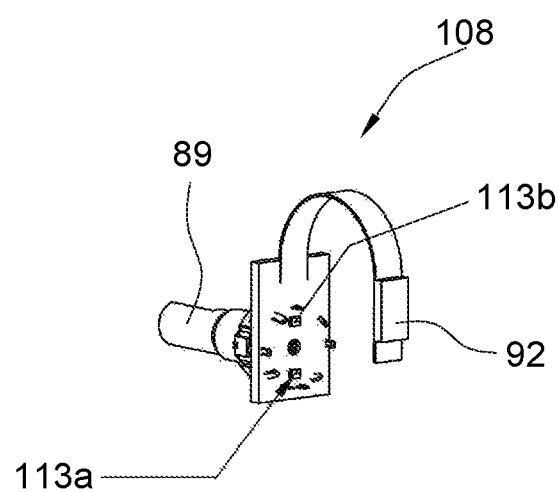

The two Hall-effect sensors that can be pivoted in common with the lever 49*m*, are marked with 113*a*, 113*b* in FIG. 19. The Hall-effect sensors 113*a*, 113*b* can ascertain a relative proximity to the fixed switching magnet 106 in the housing wall.

A further embodiment of an operating element 15*f* of a communication station 10 according to the invention will now be explained with reference to FIGS. 20 to 25.

Figure 20:
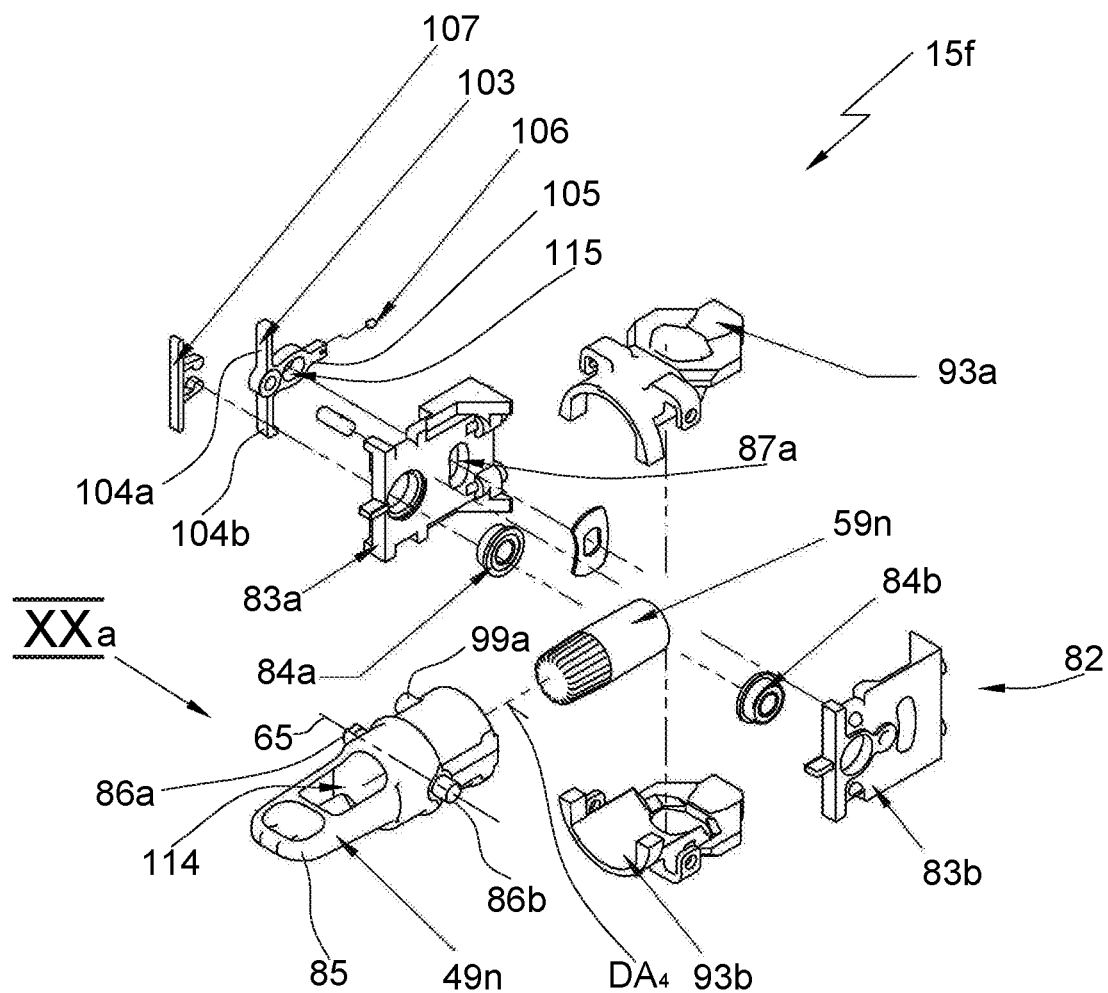
FIG. 20 shows a further embodiment of an inventive operating element in a perspective explosive view as per FIG. 12.
Figure 20A:
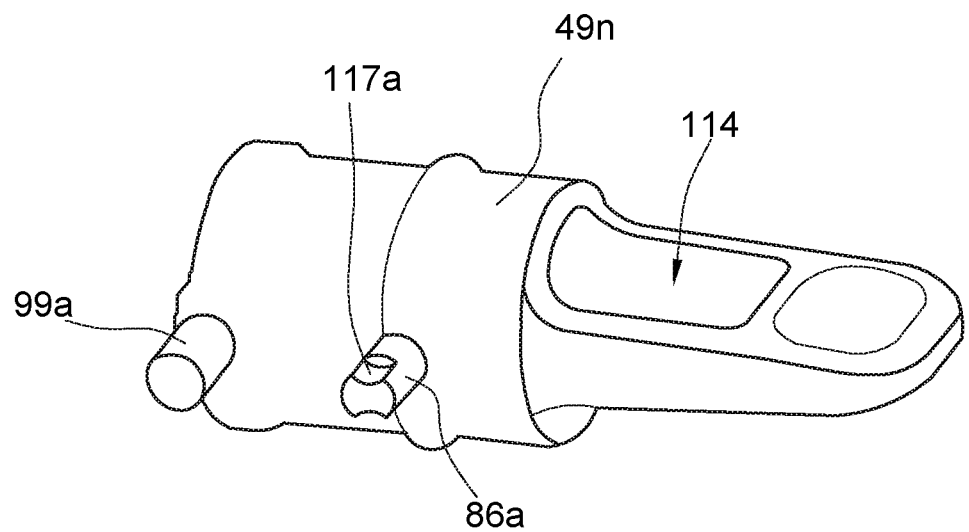
FIG. 20a shows a lever element of the operating element of FIG. 20 in detail in a rear view roughly along viewing arrow XXa in FIG. 20, FIG. 21, shows the front of an embodiment of a circuit board to which a number of operating elements as per FIG. 20 can be attached.

In this embodiment according to FIG. 20, the lever element 49*n* is again provided with pivot bearing connecting pieces 86*a*, 86*b* that are mounted in side walls 83*a*, 83*b* of a swivel holder (or mounting) 82. The swivel holder 82 is fixed relative to a circuit plate or board 94 that corresponds to the housing front 13 of the communication station, or which may be in parallel to the same behind the housing front 13 as viewed in viewing direction of the observer in FIG. 21.

Again each operating element 15*f* comprises an encoder unit 108 which is fixed on the circuit board 94. As with the previously described embodiment, a connecting piece 89 respectively extends away from the encoder unit 108, on which an adjustment element 59*n* in form of a rotary knob is positioned so as to be rotatable about a rotary axis DA4.

In the embodiment as shown in FIGS. 20 to 25 the adjustment element 59*n* is fixed relative to the circuit board 13, i.e. it is not pivotable together with the lever 49*n*.

To this end the lever 49*n* comprises a recess 114, through which the adjustment element 59*n* can pass.

Figure 23:
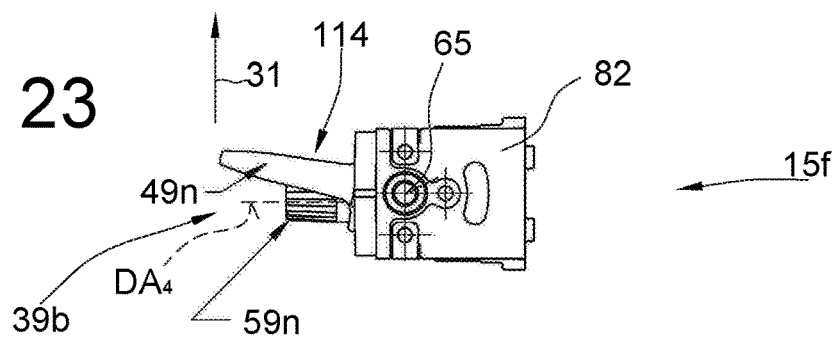
FIG. 23 shows the operating element of FIG. 22 in a lateral view roughly along viewing arrow XXIII in FIG. 22.
Figure 24:
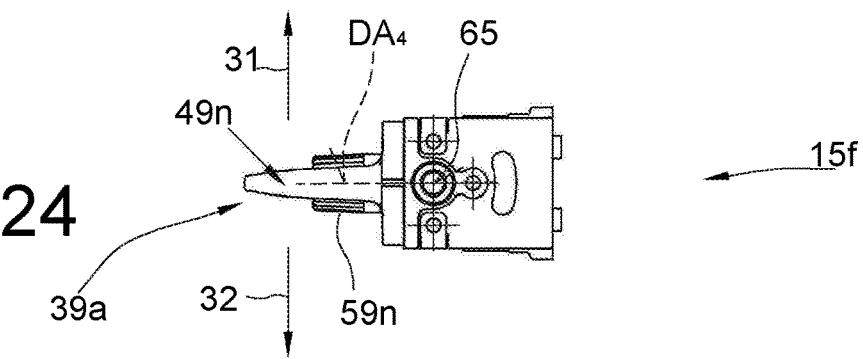
FIG. 24 shows the operating element of FIG. 23 with a lever element in the middle position.
Figure 25:
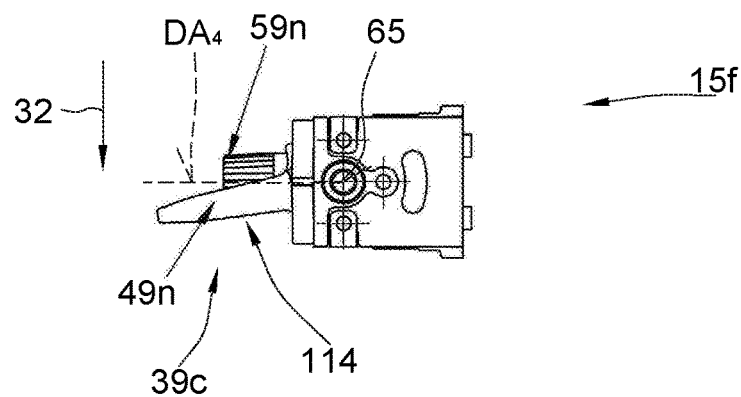
FIG. 25 shows the operating element of FIGS. 23 and 24 with the lever in yet a further position.

FIGS. 23 to 25 show different positions, in particular an inactive position/two working positions 39*a*, 39*b*, 39*c* of the lever element 49*n* relative to the adjustment element 59*n*, and they illustrate that the actuating lever 49*n* overreaches the adjustment element 59*n*, in all lever positions.

The actuating lever 49*n* comprises a body 85 which has a driving cam 99*a*. This penetrates through a corresponding link slot 87*a* in the housing wall 83*a*.

A spring element 103 is arranged immovably relative to the housing wall 83*a* that comprises two vertical holding arms 104*a* and 104*b* as well as a horizontal adjusting arm 105. A recess or receptacle 115 is in the horizontal adjusting arm 105, with the driving cam 99*a* engaging in this recess.

The vertical arms 104*a* and 104*b* are arranged fixed relative to the housing wall 83*a* and fix the spring element 103 altogether to the housing side wall 83*a*.

As the lever element 49*n* is pivoted from the inactive position as per FIG. 24 into a working position, the cam 99*a* describes a circular movement about the rotary axis 65, moving along the link slot. As it does so, it takes the adjusting arm 105 of the spring element with it, at the same time overcoming the restoring force exerted by the spring arm 105.

At the same time a switching magnet 106 is shifted along as well, which is at the free end of the deflectable arm 105 of the spring element 103.

In the deflected positions, i.e. when a working position of the lever element 49*n* is reached, the switching magnet 106 can cooperate with Hall-effect switches or Hall-effect sensors 113*a*, 113*b* that are on the circuit board 94. The deflected switching position 39*b* or 39*c* of the lever element 49*n* can be accordingly detected by the Hall-effect sensors 113*a*, 113*b*.

As soon as the operator does no longer exert a force upon the lever element 49*n*, the spring element 103 ensures that the lever element 49*n* is returned into the middle position 39*a* as per FIG. 24.

Figure 22A:
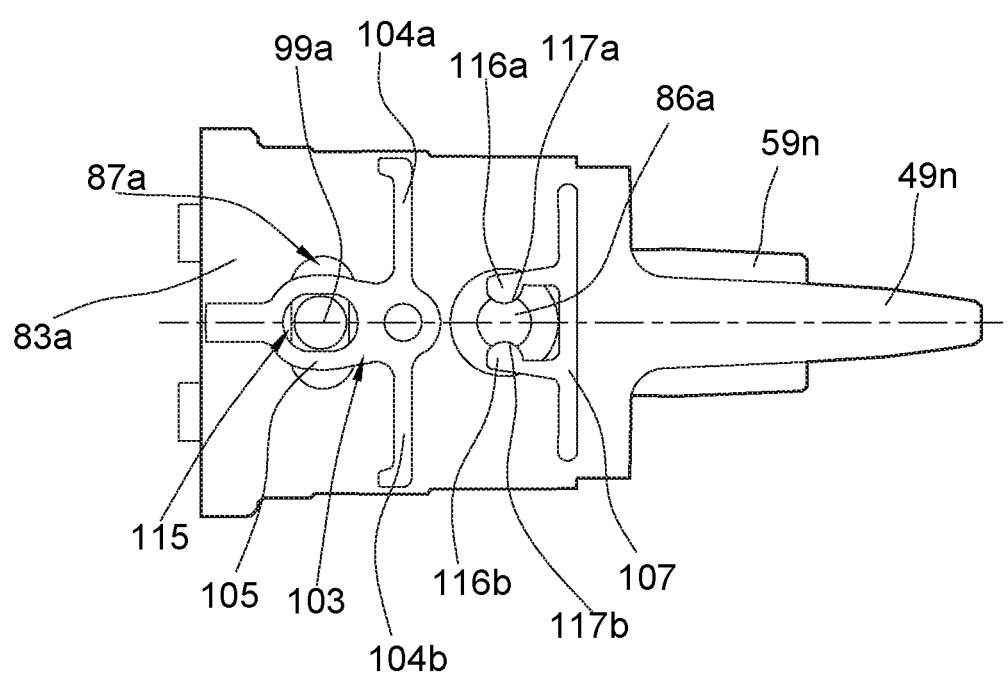
FIG. 22a shows the operating element of FIG. 22 in a rear view roughly along viewing arrow XXIIa in FIG. 22.
Figure 21:
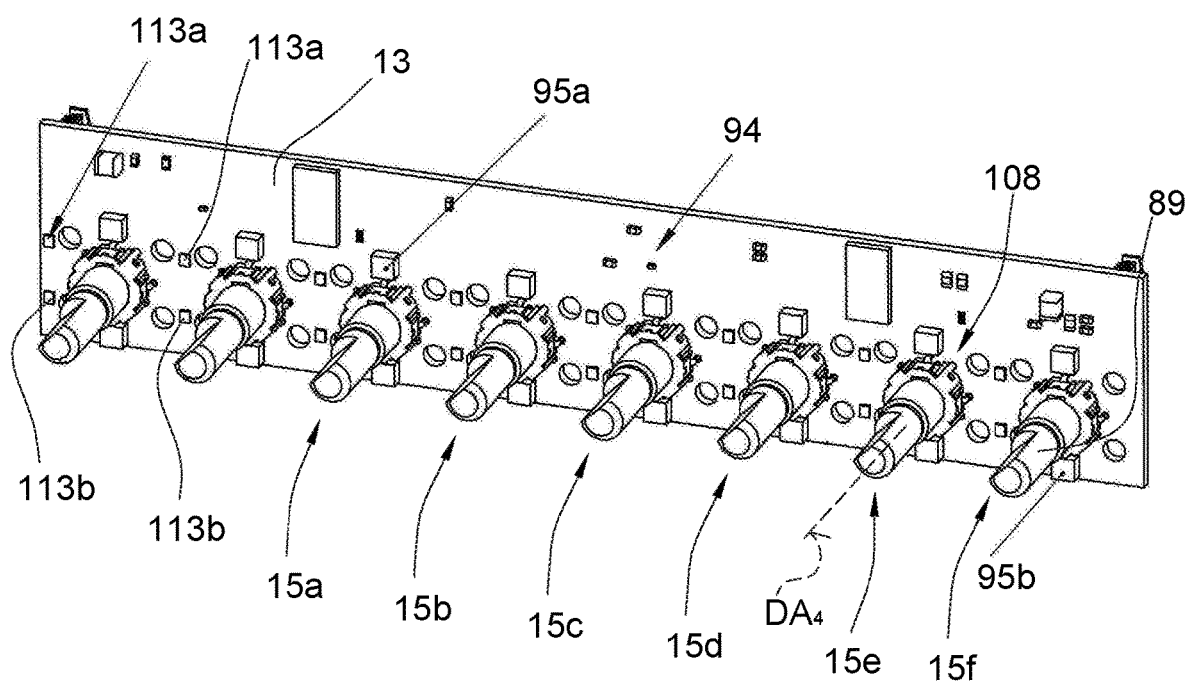
Figure 22:
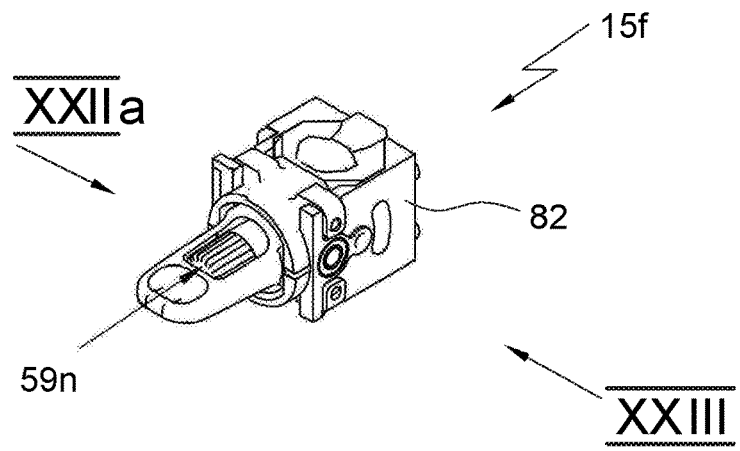
FIG. 22, is a perspective detail view of the operating element of FIG. 20 when assembled.

FIG. 20 in addition hints at a latching element 107 that can ensure that the lever element 49*n* can be arrested centrally in a mechanical manner:

The latching element 107 may for example comprise spring projections 116*a*, 116*b* as best recognized in FIG. 22*a* that can for example cooperate with corresponding complementary surfaces, in particular recesses 117*a*, 117*b* on the pivot bearing connecting piece 86*a* recognizable in FIG. 22*a*, so that when the lever 49*n* reaches its middle position, this is indicated by a tactile signal from the latching mechanism.

The embodiment in FIGS. 20-25 also ensures a particularly comfortable, reliable and error-free operation and actuation due to a direct and unequivocal spatially very close association of the adjustment element 59*n* with the corresponding actuating lever 49*n*.

In all embodiments of the present patent application it may in addition be optionally provided that the adjustment element 59*a*, 59*b*, 59*c*, 59*d*, 59*e*, 59*f*, 59*g*, 59*h*, 59*i*, 59*j*, 59*k*, 59*l*, 59*m*, 59*n* is axially shiftable in direction of its respective rotary axis DA, DA1, DA2, DA3, DA4 and can perform a button function. The axial shift of the adjustment element 59 can be detected via a sensor element not shown in the figures.

For example, by rotating the adjustment element 59*a*, 59*b*, 59*c*, 59*d*, 59*e*, 59*f*, 59*g*, 59*h*, 59*i*, 59*j*, 59*k*, 59*l*, 59*m*, 59*n*, a parameter value can be set, and the set parameter value can then be stored or accepted by means of buttons, i.e. by an axial shift of the adjustment element.

The invention also covers the case in which an axial actuation of the adjustment element 59 must be first performed in order to be able to perform a setting of the parameter value by subsequently rotating the adjustment element 59*a*, 59*b*, 59*c*, 59*d*, 59*e*, 59*f*, 59*g*, 59*h*, 59*i*, 59*j*, 59*k*, 59*l*, 59*m*, 59*n*, and subsequently a button has be actuated again in axial direction in order to confirm or store or accept the parameter value.

The invention claimed is:

1. A communication station for an intercom network for audio communication between a plurality of users and comprising:
    a housing associated with one of the users of the network and carrying a plurality of operating levers each associated with a talk/listen audio channel to a respective other one of the users and manually shiftable only linearly in a first direction starting from an inactive middle position into a first switching position corresponding to a listen mode via the respective audio channel with the respective other user or into a second switching position along a second direction opposite the first direction and corresponding to a talk mode via the respective audio channel with the respective other user,
    a spring or magnet in the housing biasing each of the levers into the respective middle position, and
    a respective adjustment element at each of the levers and rotatable independently of movement of the respective lever for changing a volume level for the listen mode of the respective operating lever between the one user and the respective other user over the respective audio channel.

2. The communication station according to claim 1, further comprising;
    a port for a headset on the housing front.

3. The communication station according to claim 1, wherein a rotary axis of the adjustment element is transverse to the first direction.

4. The communication station according to claim 1, wherein the lever is elongated and a rotary axis of the adjustment element extends along a longitudinal extension of the lever.

5. The communication station according to claim 1, wherein a number of revolutions of the adjustment element or the size of the angle of rotation about which the adjustment element has been rotated is a measure for a change of the parameter.

6. The communication station according to claim 1, wherein the communication station comprises a memory that stores the set or changed parameter value.

7. The communication station according to claim 1, wherein the parameter corresponds to a value for the volume level of the loudspeaker or comprises such a value or comprises a signal value for a volume level signal present at the loudspeaker port or a signal value for a microphone signal present at the microphone port.

8. The communication station according to claim 1, wherein the adjustment element is a continuously rotatable wheel.

9. The communication station according to claim 1, wherein actuation of the adjustment element in a first sense of rotation increases the parameter value and actuation of the adjustment element in a second sense of rotation opposite the first direction reduces the parameter value.

10. The communication station according to claim 1, wherein the adjustment element is at or close to the free end of the lever.

11. The communication station according to claim 1, wherein the adjustment element is partially surrounded by material portions of the lever that partially overreach an outer surface of the adjustment element.

12. The communication station according to claim 1, wherein the adjustment element is close to a pivoted end of the lever.

13. The communication station according to claim 1, wherein the adjustment element has ribs or projections on its outer surface.

14. The communication station according to claim 1, wherein the adjustment element is carried and rotatable on the respective lever.

15. The communication station according to claim 1, wherein the adjustment element is mounted on the housing adjacent the respective lever.

16. A communication station for an intercom network, the station comprising:
- a housing with a housing front and a housing rear side,
- a plurality of programmable operating elements,
- a plurality of displays on the housing front, the operating elements being selection buttons, the communication station, as a result of an operator actuating a selection button, providing a direct listening and/or speaking connection to a selected other communication station of the intercom network via an exchange station,
- a plurality of ports on the housing rear side,
- at least one loudspeaker or a port for a loudspeaker fixed on the housing front,
- a microphone and/or a port for a microphone on the housing front,
- a selection button manually shiftable only linearly in a first direction starting from a middle position into a first working position or alternatively shiftable in a second direction opposite the first direction into a second working position,
- a spring or magnet biasing the selection button toward its middle position, and
- a volume-adjustment element rotatable independently of movement of the respective lever, the selection button comprising or spanning over the rotatable adjustment element.

17. The communication station according to claim 16, wherein the selection button is a lever.

18. A communication station for an intercom network, the station comprising:
- a plurality of operating levers of which one is manually shiftable only linearly in a first direction from an inactive middle position into a first switching position or shiftable in a second direction opposite the first direction into a second switching position;
- a magnet biasing the one lever toward its middle position, the magnet exerting high forces up on the one lever when close to the middle position, the forces being effective on the one lever to displace the one lever toward its middle position; and
- a spring element separate from the magnet that biases the one lever toward the respective middle position.

* * * * *